(12) United States Patent
Muto

(10) Patent No.: US 11,472,401 B2
(45) Date of Patent: Oct. 18, 2022

(54) PARKING ASSISTANCE DEVICE

(71) Applicant: CLARION CO., LTD., Saitama (JP)

(72) Inventor: Koji Muto, Saitama (JP)

(73) Assignee: CLARION CO., LTD., Saitama (JP)

( * ) Notice: Subject to any disclaimer, the term of this patent is extended or adjusted under 35 U.S.C. 154(b) by 24 days.

(21) Appl. No.: 17/254,337

(22) PCT Filed: Dec. 25, 2018

(86) PCT No.: PCT/JP2018/047530
§ 371 (c)(1),
(2) Date: Dec. 21, 2020

(87) PCT Pub. No.: WO2020/003558
PCT Pub. Date: Jan. 2, 2020

(65) Prior Publication Data
US 2021/0323539 A1   Oct. 21, 2021

(30) Foreign Application Priority Data
Jun. 26, 2018   (JP) .............................. JP2018-120666

(51) Int. Cl.
*G08G 1/14*   (2006.01)
*B60W 30/06*   (2006.01)
(Continued)

(52) U.S. Cl.
CPC .............. *B60W 30/06* (2013.01); *B60R 1/00* (2013.01); *G01S 15/931* (2013.01); *G06V 20/58* (2022.01);
(Continued)

(58) Field of Classification Search
CPC .... B60W 30/06; B60R 1/00; B60R 2300/105; B60R 2300/806; G01S 15/931;
(Continued)

(56) References Cited

U.S. PATENT DOCUMENTS

2010/0238051 A1   9/2010   Suzuki et al.
2014/0350855 A1*  11/2014   Vishnuvajhala ......... G07C 1/30
                                                       701/538
(Continued)

FOREIGN PATENT DOCUMENTS

CA    3 002 638 A1   4/2017
CN    108 025 746 A  5/2018
(Continued)

OTHER PUBLICATIONS

International Preliminary Report on Patentability of PCT Application No. PCT/JP2018/047530 dated Jan. 7, 2021.
(Continued)

*Primary Examiner* — Anh V La
(74) *Attorney, Agent, or Firm* — IP Business Solutions, LLC

(57) ABSTRACT

A parking assistance device includes a parking region detection unit configured to periodically detect a parking-possible space in which the own-vehicle can be parked based on a result of detection by an external image capturing camera and a sonar configured to periodically detect the status of surroundings of the own-vehicle, a candidate region selection unit configured to select a parking candidate space as a parking candidate for the own-vehicle among the parking-possible spaces detected by the parking region detection unit, and a display control unit configured to cause a touch panel to display a surrounding image in which a parking position image illustrating a parking position is superimposed on the parking candidate space selected by the candidate region selection unit, and the candidate region selection unit continuously selects, as the parking candidate space, the parking-possible space corresponding to the selected parking candidate space for a predetermined duration.

10 Claims, 16 Drawing Sheets

(51) Int. Cl.
  *B60R 1/00*  (2022.01)
  *G01S 15/931*  (2020.01)
  *G06V 20/58*  (2022.01)

(52) U.S. Cl.
  CPC .......... *G06V 20/586* (2022.01); *G08G 1/143* (2013.01); *B60R 2300/105* (2013.01); *B60R 2300/806* (2013.01); *G01S 2015/932* (2013.01)

(58) Field of Classification Search
  CPC  G01S 2015/932; G06V 20/58; G06V 20/586; G08G 1/143; G08G 1/168
  USPC ...................... 340/932.2, 933, 937, 988, 990
  See application file for complete search history.

(56) References Cited

U.S. PATENT DOCUMENTS

| | | | |
|---|---|---|---|
| 2016/0078766 | A1 | 3/2016 | Kiyokawa et al. |
| 2017/0132482 | A1* | 5/2017 | Kim .......................... G06T 7/73 |
| 2018/0204464 | A1 | 7/2018 | Lavoie et al. |
| 2018/0208245 | A1* | 7/2018 | Mizutani ............... B60W 30/06 |
| 2018/0229720 | A1* | 8/2018 | Benmimoun ......... B60W 50/14 |
| 2018/0244286 | A1 | 8/2018 | Sakai et al. |
| 2018/0286240 | A1 | 10/2018 | Harai |
| 2019/0276010 | A1* | 9/2019 | Mason ................... G08G 1/143 |
| 2020/0062242 | A1 | 2/2020 | Hayakawa |

FOREIGN PATENT DOCUMENTS

| | | |
|---|---|---|
| EP | 3367367 A1 | 8/2018 |
| JP | 2009-101984 A | 5/2009 |
| JP | 2009-143410 A | 7/2009 |
| JP | 2015-227139 A | 12/2015 |
| JP | 2016-60238 A | 4/2016 |
| JP | 2016-215691 A1 | 12/2016 |
| JP | 2018-30580 A | 3/2018 |
| WO | 2017/030521 A1 | 2/2017 |
| WO | 2017/068698 A1 | 4/2017 |
| WO | 2017/072956 A1 | 5/2017 |

OTHER PUBLICATIONS

Written Opinion of the International Searching Authority of PCT Application No. PCT/JP2018/047530 dated Feb. 26, 2019.
International Search Report of PCT/JP2018/047530 dated Feb. 26, 2019.
Written Opinion of the International Searching Authority of PCT/JP2018/047530 dated Feb. 26, 2019.
Japanese Office Action mailed by Japanese Patent Office dated Apr. 12, 2022 in corresponding Japanese patent application No. 2018-120666.
Extended European Search Report mailed by European Patent Office dated Feb. 22, 2022 in corresponding European patent application No. 18924129.2-1203.

* cited by examiner

PARKING ASSISTANCE DEVICE

TECHNICAL FIELD

The present invention relates to a parking assistance device.

BACKGROUND ART

Conventionally, a device configured to assist parking of a vehicle by displaying a parking position at which the vehicle can be parked has been known (for example, refer to Patent Literature 1). Patent Literature 1 discloses a parking assistance device configured to detect an obstacle around a vehicle based on a captured image, detect a vacant space based on a result of the obstacle detection, and display, as a parking position, a parking space in which the vehicle can be parked in the detected vacant space.

CITATION LIST

Patent Literature

Patent Literature 1

Japanese Patent Laid-Open No. 2016-215691

SUMMARY OF INVENTION

Technical Problem

However, according to Patent Literature 1, since the parking position is determined based on a captured image, the parking position being displayed is unstable due to image change attributable to displacement of the vehicle or change in the status of surroundings of the vehicle, false recognition of a captured image, and the like, which potentially causes discomfort, unpleasantness, and the like to a user.

Thus, the present invention is intended to stably display a parking position at which a vehicle can be parked.

Solution to Problem

The entire contents of Japanese Patent Application No. 2018-120666, filed on Jun. 26, 2018 are incorporated herein.

To achieve the above-described intention, a parking assistance device according to an aspect of the present invention includes: a parking region detection unit configured to periodically detect a parking-possible region in which a vehicle can be parked based on a result of detection by a detection unit configured to periodically detect the status of surroundings of the vehicle; a candidate region selection unit configured to select a parking candidate region as a parking candidate for the vehicle among the parking-possible regions detected by the parking region detection unit; and a display control unit configured to cause a display unit to display an image of surroundings of the vehicle in which a parking position image illustrating a parking position is superimposed on the parking candidate region selected by the candidate region selection unit, and the candidate region selection unit continuously selects, as the parking candidate region, the parking-possible region corresponding to the selected parking candidate region for a predetermined duration.

In another aspect of the present invention, when a plurality of the parking-possible regions at least partially overlapping with each other are detected by the parking region detection unit, the candidate region selection unit may select one parking-possible region as the parking candidate region based on a predetermined priority order.

Another aspect of the present invention may include a path calculation unit configured to calculate a traveling path from the current position of the vehicle to the parking-possible region detected by the parking region detection unit, and the candidate region selection unit select, as the parking candidate region, the parking-possible region, the traveling path of which is calculated by the path calculation unit among the parking-possible regions detected by the parking region detection unit.

In another aspect of the present invention, the detection unit may detect an obstacle existing in surroundings of the vehicle, and the candidate region selection unit may select, as the parking candidate region, the parking-possible region in which no obstacle is detected by the detection unit among the parking-possible regions detected by the parking region detection unit.

In another aspect of the present invention, the candidate region selection unit may select, as the parking candidate region, the parking-possible region at least partially included in a display region of the display unit among the parking-possible regions detected by the parking region detection unit.

In another aspect of the present invention, the candidate region selection unit may select, as the parking candidate region, the parking-possible region, a tilt of which relative to a front-back direction of the vehicle is in a predetermined range among the parking-possible regions detected by the parking region detection unit.

In another aspect of the present invention, the candidate region selection unit may select, as the parking candidate region, the parking-possible region not overlapping with the vehicle among the parking-possible regions detected by the parking region detection unit.

In another aspect of the present invention, the candidate region selection unit may select, as the parking candidate regions in an ascending order of a separation distance from the current position of the vehicle, a predetermined number or less of the parking-possible regions detected by the parking region detection unit.

In another aspect of the present invention, when there are a plurality of the selected parking candidate regions, the candidate region selection unit may select a first parking candidate region in which parking of the vehicle is recommended and a second parking candidate region different from the first parking candidate region.

In another aspect of the present invention, the display control unit may display, in manners different from each other, the parking position image superimposed on the first parking candidate region and the parking position image superimposed on the second parking candidate region.

In another aspect of the present invention, the parking position image may be a parking boundary image illustrating a parking boundary.

Advantageous Effects of Invention

According to aspects of the present invention, it is possible to stably display a parking position at which a vehicle can be parked.

DESCRIPTION OF EMBODIMENT

Figure 1:
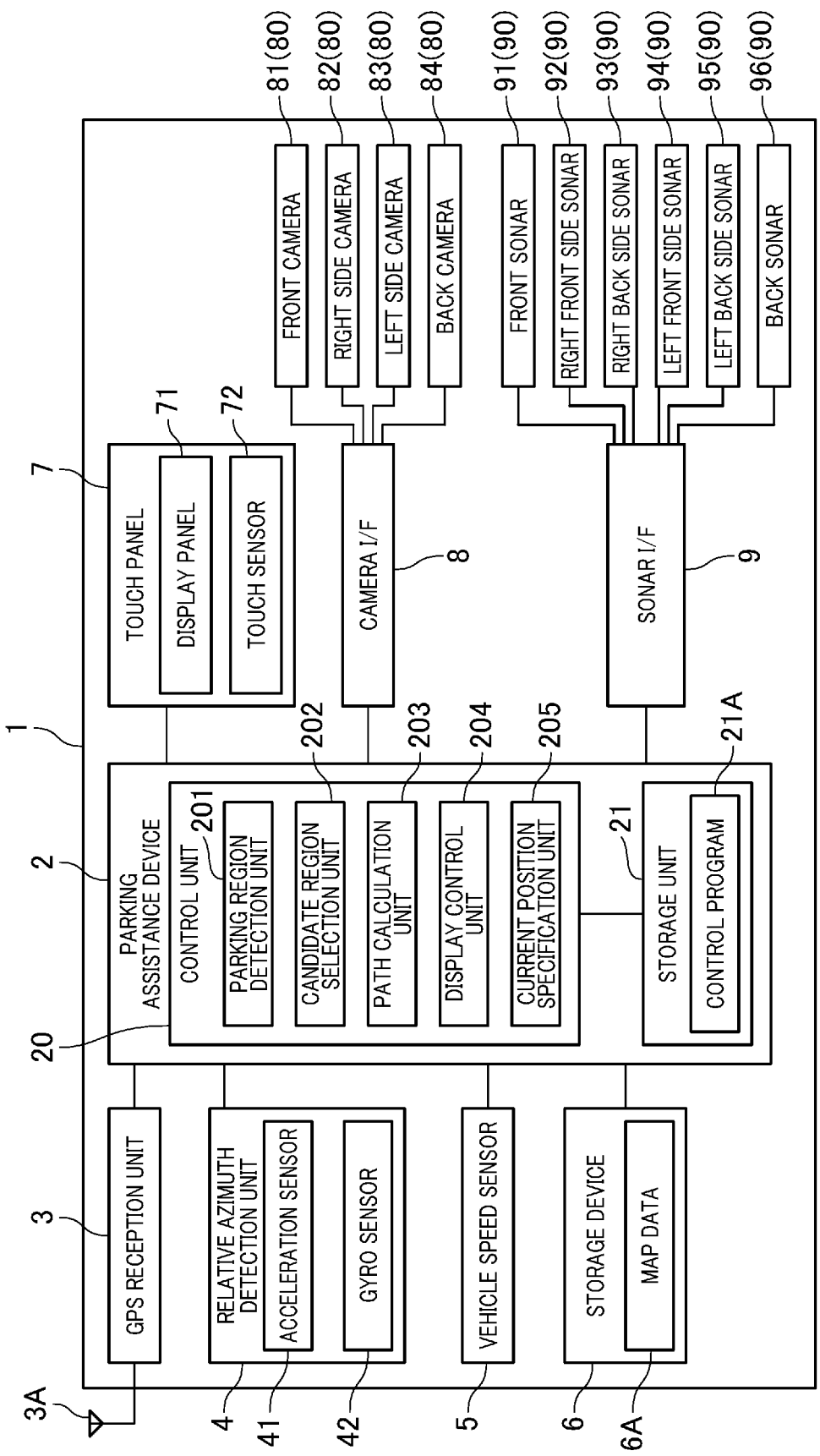
FIG. 1 is a diagram illustrating the configuration of an own-vehicle on which a parking assistance device is mounted.

FIG. 1 is a diagram illustrating the configuration of an own-vehicle 1 (vehicle) on which a parking assistance device 2 is mounted.

The own-vehicle 1 is a vehicle on which the parking assistance device 2 is mounted. In the following description, another vehicle different from the own-vehicle 1 is referred to as an "other-vehicle" and denoted by reference sign 300.

The own-vehicle 1 is a vehicle that passengers including a driver are aboard and can be driven by the driver. The own-vehicle 1 may be a vehicle that can be manually operated and travels while the driver performs operations related to driving or may be a vehicle that can perform automated driving and automatically travels while the driver does not perform operations related to driving. The own-vehicle 1 is, for example, an engine-driven four-wheeled vehicle, a motor-driven electric vehicle, or a hybrid vehicle on which a motor and an engine are mounted. The own-vehicle 1 may be a vehicle other than a four-wheeled vehicle.

The parking assistance device 2 assists a user such as the driver of the own-vehicle 1 at parking of the own-vehicle 1 by manual driving or automated driving. The parking assistance device 2 may be a dedicated device, may be configured as a partial function of a navigation device having a navigation function, or may be configured as a partial function of a control device configured to control automated driving.

The parking assistance device 2 includes a control unit 20 and a storage unit 21.

The control unit 20 includes a CPU, a ROM, a RAM, and other peripheral circuits (none of which are illustrated) as hardware and controls each component of the parking assistance device 2. The CPU is a processor configured to execute arithmetic processing and executes arithmetic processing in accordance with a control program 21A stored in the ROM or the storage unit 21. The ROM is a non-transitory memory and stores, for example, the control program 21A and calculation data. The RAM is used as a work area that temporarily stores the control program 21A executed by the processor and calculation data.

The control unit 20 includes, as functional blocks, a parking region detection unit 201, a candidate region selection unit 202, a path calculation unit 203, a display control unit 204, and a current position specification unit 205. Each functional block of the control unit 20 is an expedient block of a function achieved by the CPU executing arithmetic processing in accordance with the control program 21A and is not a particular application software nor hardware. Each functional block will be described later.

The storage unit 21 includes a non-transitory memory such as a hard disk or an EEPROM and stores data in a rewrite manner. The storage unit 21 may include a transitory memory such as a RAM. The storage unit 21 stores the control program 21A.

The parking assistance device 2 is connected with a GPS reception unit 3, a relative azimuth detection unit 4, a vehicle speed sensor 5, a storage device 6, a touch panel 7 (display unit), a camera interface 8 (hereinafter referred to as the "camera I/F 8"), and a sonar interface 9 (hereinafter referred to as the "sonar I/F 9").

The GPS reception unit 3 periodically receives, through a GPS antenna 3A, GPS signals transmitted from GPS satellites. Then, the GPS reception unit 3 calculates the absolute position (latitude and longitude) of the own-vehicle 1 by measuring the distance between the own-vehicle 1 and each GPS satellite of a predetermined number or more of satellites and the change rate of the distance based on the received GPS signals. The GPS reception unit 3 outputs absolute position information indicating the absolute position of the own-vehicle 1 to the parking assistance device 2. In addition, the GPS reception unit 3 calculates the angle (hereinafter referred to as the "azimuth") of the traveling direction of the own-vehicle 1 and outputs azimuth information indicating the azimuth of the own-vehicle 1 to the parking assistance device 2.

The relative azimuth detection unit 4 includes an acceleration sensor 41 and a gyro sensor 42. The acceleration sensor 41 detects acceleration (for example, the tilt of the own-vehicle 1 relative to the traveling direction) acting on the own-vehicle 1. The gyro sensor 42 is, for example, a vibration gyro sensor and detects a relative azimuth (for example, the amount of rotation in the yaw axial direction) of the own-vehicle 1. The relative azimuth detection unit 4 outputs relative azimuth information indicating the detected relative azimuth to the parking assistance device 2.

The vehicle speed sensor 5 detects the number of rotations of a wheel axis per unit time and periodically acquires the vehicle speed of the own-vehicle 1 based on the detected number of rotations. The vehicle speed sensor 5 outputs vehicle speed information indicating the detected vehicle speed of the own-vehicle 1 to the parking assistance device 2.

The storage device 6 includes a non-transitory memory such as a hard disk, an EEPROM, or an SSD and stores data in a rewrite manner. The storage device 6 stores map data 6A.

The map data 6A stores, for example, road map information, facility information of various facilities and the like, and map matching data. The road map information is made of a road network in which roads on a map are expressed with lines, and includes link information in which the road network is divided into a plurality of parts with intersection points, bifurcation points, and the like as nodes, and each part between nodes is defined as a link. The link information includes information such as a link ID unique to a link, the length of the link, the positions (longitudes and latitudes) of the starting and end points of the link, the angle of the link, and the kind of a road corresponding to the link.

The touch panel 7 includes a display panel 71 and a touch sensor 72. The display panel 71 includes a liquid crystal display, an electro luminescent (EL) display, or the like and displays various kinds of information under control of the parking assistance device 2. The touch sensor 72 is provided over or integrally with the display panel 71, detects a touch operation by the user, and outputs a result of the detection to the parking assistance device 2. The parking assistance device 2 executes processing corresponding to the result of detection by the touch sensor 72.

Under control of the parking assistance device 2, the camera I/F 8 communicates with an external image capturing camera 80 (detection unit) configured to capture an image of the outside of the vehicle.

The own-vehicle 1 is provided with the four external image capturing cameras 80 of a front camera 81, a right side camera 82, a left side camera 83, and a back camera 84.

Figure 2:
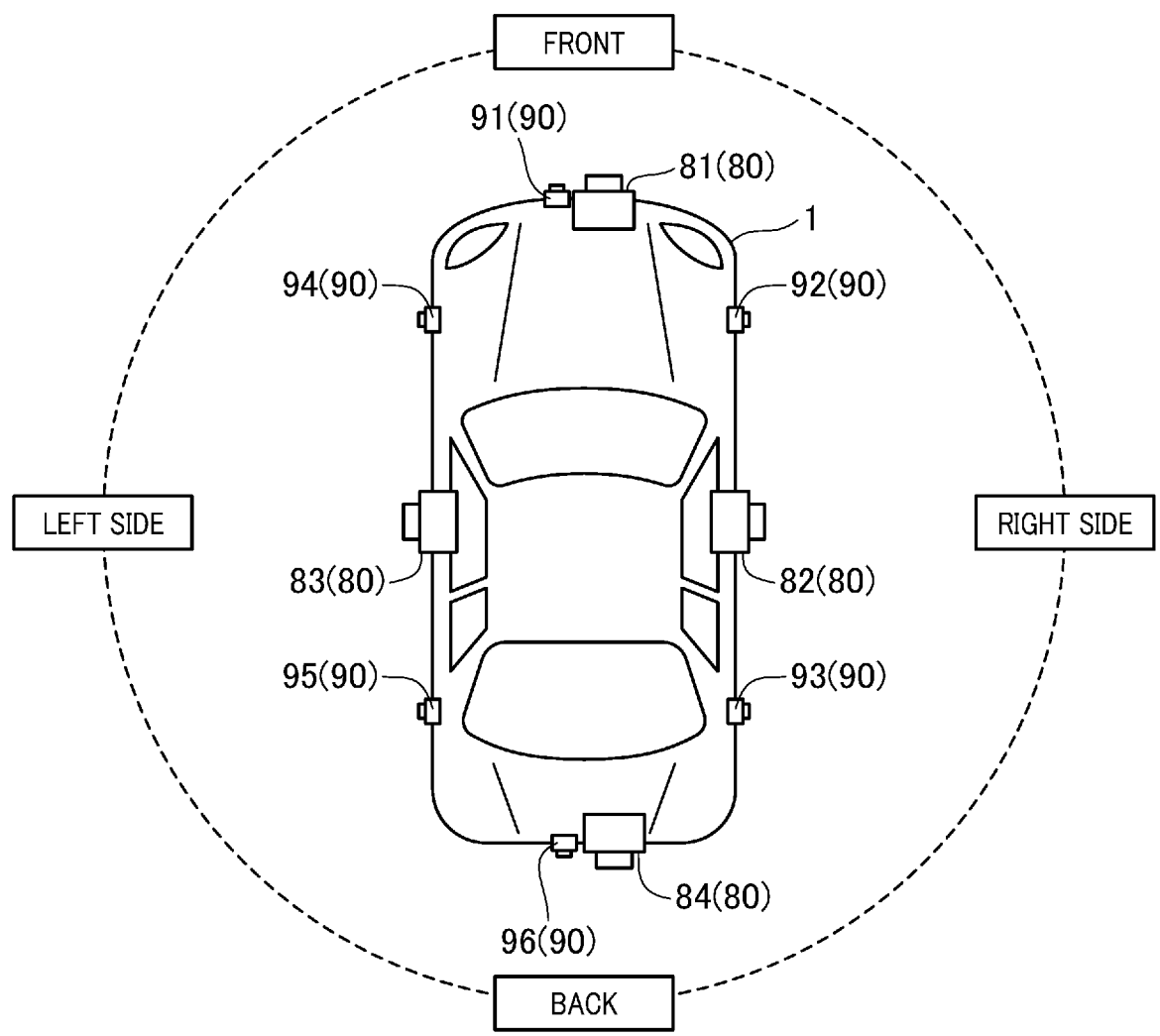
FIG. 2 is a diagram for description of an external image capturing camera and a sonar.

FIG. 2 is a diagram for description of the external image capturing camera 80 and a sonar 90 (detection unit). The sonar 90 will be described later.

The front camera 81 is the external image capturing camera 80 configured to capture an image of the front side of the own-vehicle 1. The front camera 81 is provided at, for example, a position on the front side in the own-vehicle 1. The front side of the own-vehicle 1 is a side on which the headlights, the front glass, and the like are provided in the own-vehicle 1.

The right side camera 82 is the external image capturing camera 80 configured to capture an image of the right side of the own-vehicle 1. The right side camera 82 is provided at, for example, a position on the right side in the own-vehicle 1. The right side of the own-vehicle 1 is the right side in a view toward the front side of the own-vehicle 1.

The left side camera 83 is the external image capturing camera 80 configured to capture an image of the left side of the own-vehicle 1. The left side camera 83 is provided at, for example, a position on the left side in the own-vehicle 1. The left side of the own-vehicle 1 is the left side in a view toward the front side of the own-vehicle 1.

The back camera 84 is the external image capturing camera 80 configured to capture an image of the back side of the own-vehicle 1. The back camera 84 is provided at, for example, a position on the back side in the own-vehicle 1. The back side of the own-vehicle 1 is a side on which the rear glass and the like are provided in the own-vehicle 1.

The angle of view of each of the four external image capturing cameras 80 is adjusted so that the four external image capturing cameras 80 can perform image capturing in the range of 360° centered at the own-vehicle 1.

FIG. 2 is a diagram schematically illustrating the positions of the external image capturing cameras 80 provided to the own-vehicle 1 and does not necessarily illustrate actual provision of the external image capturing cameras 80 on the outside of the vehicle body.

Each external image capturing camera 80 executes image capturing in a predetermined period, generates captured image data based on a result of the image capturing, and outputs the generated captured image data to the parking assistance device 2 through the camera interface 8. Image capturing of the outside of the vehicle by each external image capturing camera 80 corresponds to "detection of the status of surroundings of the own-vehicle 1 by the external image capturing camera 80".

The aspect of the external image capturing cameras 80 provided to the own-vehicle 1 is not limited to the aspect illustrated in FIG. 2. Specifically, the number of external image capturing cameras 80 provided to the own-vehicle 1 may be larger or smaller as long as image capturing can be performed in the range of 360° centered at the own-vehicle 1. For example, the own-vehicle 1 may be provided with eight external image capturing cameras 80 that capture images of the front side, the right front side, the right side, the right back side, the back side, the left back side, the left side, and the left front side.

As illustrated in FIG. 1, under control of the parking assistance device 2, the sonar I/F 9 communicates with the sonar 90 configured to detect an object in surroundings of the own-vehicle 1. The own-vehicle 1 is provided with the six sonars 90 of a front sonar 91, a right front side sonar 92, a right back side sonar 93, a left front side sonar 94, a left back side sonar 95, and a back sonar 96.

As illustrated in FIG. 2, the front sonar 91 is provided at a position on the front side in the own-vehicle 1 and detects an object on the front side of the own-vehicle 1.

The right front side sonar 92 is provided at a position on the front side on the right side in the own-vehicle 1 and detects an object on the right front side in the right side of the own-vehicle 1.

The right back side sonar 93 is provided at a position on the back side on the right side in the own-vehicle 1 and detects an object on the right back side in the right side of the own-vehicle 1.

The left front side sonar 94 is provided at a position on the front side on the left side in the own-vehicle 1 and detects an object on the left front side in the left side of the own-vehicle 1.

The left back side sonar 95 is provided at a position on the back side on the left side in the own-vehicle 1 and detects an object on the left back side in the left side of the own-vehicle 1.

The back sonar 96 is provided at a position on the back side in the own-vehicle 1 and detects an object on the back side of the own-vehicle 1.

Similarly to a case of the external image capturing cameras 80, FIG. 2 does not necessarily illustrate actual provision of the sonars 90 on the outside of the vehicle body.

Each sonar 90 detects an object in surroundings of the own-vehicle 1 by using ultrasonic wave in a predetermined period and outputs a result of the detection to the parking assistance device 2 through the sonar I/F 9.

The aspect of the sonars 90 provided to the own-vehicle 1 is not limited to the aspect illustrated in FIG. 2. The number of sonars 90 provided to the own-vehicle 1 may be larger or smaller.

Figure 3:
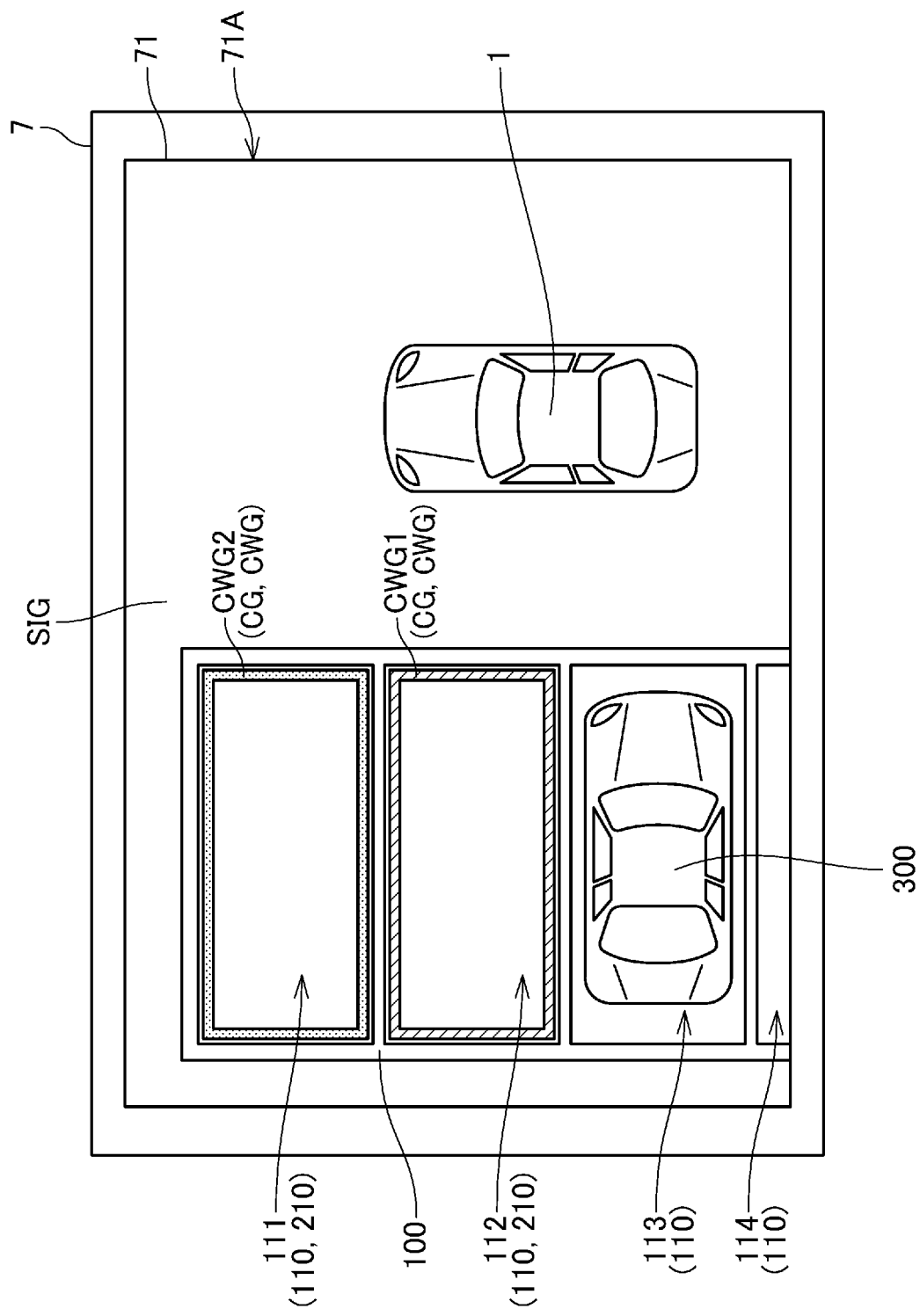
FIG. 3 is a diagram illustrating an exemplary surrounding image.

With the above-described configuration, the parking assistance device 2 assists the user at parking of the own-vehicle 1 by causing the touch panel 7 to display a surrounding image SIG that is an image of surroundings of the own-vehicle 1 as illustrated in FIG. 3.

FIG. 3 is a diagram illustrating an exemplary surrounding image SIG.

FIG. 3 exemplarily illustrates the surrounding image SIG displayed in a display region 71A of the display panel 71 of the touch panel 7.

As illustrated in FIG. 3, the surrounding image SIG is a panoramic image of the own-vehicle 1. The panoramic image of the own-vehicle 1 is an image of the entire own-vehicle 1 and surroundings of the own-vehicle 1 when viewed from above.

The surrounding image SIG illustrated in FIG. 3 is an image of a case in which the own-vehicle 1 is positioned in a place such as a car park in which a plurality of parking spaces 110 are provided. The surrounding image SIG illustrated in FIG. 3 includes the four parking spaces 110 partitioned from each other by a parking boundary line 100 on the left side of the own-vehicle 1.

A parking space 111 is a parking space 110 in which no other-vehicle 300 and no object (hereinafter referred to as "obstacle") that interferes with parking of the own-vehicle 1 exist, and is a parking space 110 in which the own-vehicle 1 can be parked. In the following description, the parking space 110 in which the own-vehicle 1 can be parked is referred to as a "parking-possible space" (parking-possible region) and denoted by reference sign 210.

A parking space 112 is a parking-possible space 210. A parking space 113 is a parking space 110 in which the other-vehicle 300 exists, and is a parking space 110 in which the own-vehicle 1 cannot be parked.

A parking space 114 is a parking space 110 in which no other-vehicle 300 exists. However, since the parking space 114 is only partially displayed in the display region 71A of the touch panel 7 in the surrounding image SIG illustrated in FIG. 3, the parking space 114 is a parking space 110 that is not a parking-possible space 210.

As illustrated in FIG. 3, the touch panel 7 displays the surrounding image SIG in which a parking position image CG illustrating a parking position is superimposed on each of the parking spaces 111 and 112 as the parking-possible spaces 210. The parking position image CG is a parking boundary image CWG illustrating a parking boundary.

The parking boundary image CWG includes a recommendation parking boundary image CWG1 for clearly indicating a parking position at which parking of the own-vehicle 1 is most recommended by the parking assistance device 2, and a candidate parking boundary image CWG2 for clearly indicating a parking position as a parking candidate for the own-vehicle 1, the parking position being other than the parking position clearly indicated by the recommendation parking boundary image CWG1. The recommendation parking boundary image CWG1 and the candidate parking boundary image CWG2 are superimposed on the surrounding image SIG in display manners different from each other in, for example, color.

In FIG. 3, the recommendation parking boundary image CWG1 is superimposed on the parking space 111 and the candidate parking boundary image CWG2 is superimposed on the parking space 112. Accordingly, the surrounding image SIG illustrated in FIG. 3 indicates that, among the parking-possible spaces 210, the parking space 112 is a parking position most recommended and the parking space 111 is a parking position as a parking candidate for the own-vehicle 1.

The parking assistance device 2 allows the user to recognize whether any parking-possible space 210 exists in surroundings of the own-vehicle 1 by causing the touch panel 7 to display the surrounding image SIG as illustrated in FIG. 3. In addition, the parking assistance device 2 allows the user to recognize which of the parking-possible spaces 210 existing in surroundings of the own-vehicle 1 is most recommended. Thus, the parking assistance device 2 can assist the user at parking of the own-vehicle 1.

The parking assistance device 2 of the present embodiment further executes operation described below to provide sufficient assistance at parking of the own-vehicle 1 without causing discomfort to the user visually recognizing the touch panel 7.

Figure 4:
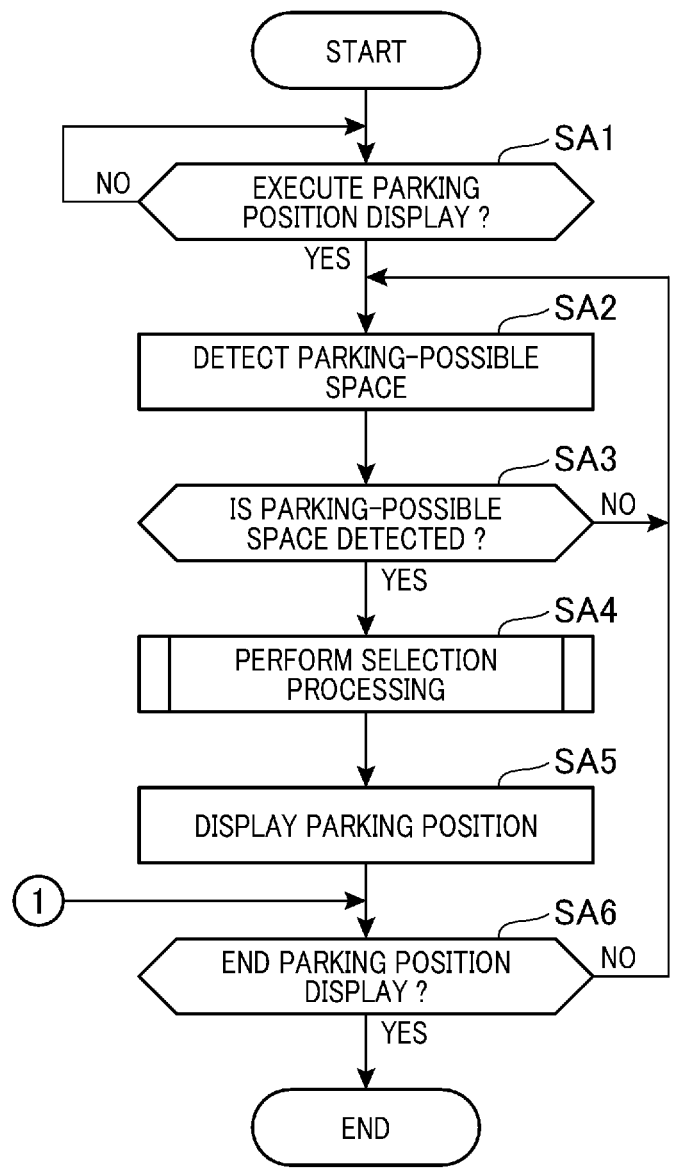
FIG. 4 is a flowchart illustrating the operation of the parking assistance device.

FIG. 4 is a flowchart illustrating the operation of the parking assistance device 2.

FIG. 4 is based on an assumption that the parking assistance device 2 is turned on and the system of the parking assistance device 2 is activated.

The following describes the operation of the parking assistance device 2 through description of the parking region detection unit 201, the candidate region selection unit 202, the path calculation unit 203, the display control unit 204, and the current position specification unit 205 as the functional blocks of the control unit 20.

The display control unit 204 of the control unit 20 of the parking assistance device 2 determines whether to cause the touch panel 7 to execute parking position display (step SA1). The parking position display is operation to display the surrounding image SIG in which any parking boundary image CWG is superimposed as illustrated in FIG. 3. For example, when the touch panel 7 has received an operation by the user indicating an instruction to execute the parking position display, the display control unit 204 determines to cause the touch panel 7 to execute the parking position display (YES at step SA1). For example, when the current position of the own-vehicle 1 specified by the current position specification unit 205 is a position in a place such as a car park including one or a plurality of parking spaces 110, the display control unit 204 determines to cause the touch panel 7 to execute the parking position display (YES at step SA1).

The current position specification unit 205 specifies the current position of the own-vehicle 1 as described below.

The current position specification unit 205 specifies the current position of the own-vehicle 1 based on the absolute position information and the azimuth information input from the GPS reception unit 3, the relative azimuth information of the own-vehicle 1 input from the relative azimuth detection unit 4, various kinds of information included in the map data 6A stored in the storage device 6, and the vehicle speed information input from the vehicle speed sensor 5. For example, the current position specification unit 205 estimates the speed, moving direction, and the like of the own-vehicle 1 as needed based on the information input from various sensors such as the relative azimuth detection unit 4 and the various kinds of information included in the map data 6A, and corrects, based on the estimated moving speed and moving direction and the like, the position of the own-vehicle 1 calculated based on the input from the GPS reception unit 3, thereby specifying the current position of the own-vehicle 1. The current position specification unit 205 may specify the current position of the own-vehicle 1 based on various kinds of additional information. The current position specification unit 205 may specify the current position of the own-vehicle 1 by using signals of a positioning satellite system such as GLONASS, Galileo, Beidou, or QZSS (Michibiki) in addition to GPS signals. The current position specification unit 205 may calculate and specify, in accordance with the reception status of the GPS reception unit 3, the current position of the own-vehicle 1 by autonomous navigation based on, for example, a result of detection by the relative azimuth detection unit 4 and the speed of the own-vehicle 1 detected by the vehicle speed sensor 5.

Having executed the processing at step SA1, the parking assistance device 2 executes processing at step SA2 and later. The parking assistance device 2 executes the processing at step SA2 and later a plurality of times until positive determination is made at processing at step SA6. The parking assistance device 2 executes different pieces of processing between the first time processing since the start of the present process and the second or later processing in the plurality of times of execution of the processing at step SA2 and later. The operation of the parking assistance device 2 will be described below separately for each of the first time processing and the second time or later processing.

[First Time Processing]

The following first describes the operation of the parking assistance device 2 when the processing at step SA2 and later are executed for the first time since the start of the present process.

When the display control unit 204 determines to cause the touch panel 7 to execute the parking position display (YES at step SA1), the parking region detection unit 201 of the control unit 20 detects any parking-possible space 210 based on a captured image obtained by each external image capturing camera 80 and a result of detection by each sonar 90 (step SA2). At execution of step SA2, the parking region detection unit 201 detects any parking-possible space 210 based on captured image data obtained by each external image capturing camera 80 and the result of detection by each sonar 90, which are input at the timing of execution of step SA2.

Step SA2 will be described below in detail.

At step S2, the parking region detection unit 201 first generates panoramic image data FGD (refer to FIG. 7, for example) representing a panoramic image of the own-vehicle 1. The panoramic image represented by the generated panoramic image data FGD may or may not correspond to the surrounding image SIG displayed on the touch panel 7. The parking region detection unit 201 generates the panoramic image data FGD based on the captured image data input from each of the front camera 81, the right side camera 82, the left side camera 83, and the back camera 84. The processing of generating the panoramic image data FGD based on the captured image data input from the plurality of external image capturing cameras 80 is performed appropriately by an existing technology. The external image capturing cameras 80 execute image capturing in synchronization and output the captured image data based on results of the image capturing to the parking assistance device 2 in synchronization.

Then, the parking region detection unit 201 loads the generated panoramic image data FGD onto a predetermined storage region for which a predetermined coordinate system is defined, and detects any parking-possible space 210. The parking region detection unit 201 detects, from the panoramic image data FGD by using an existing technology such as pattern matching, a predetermined detection target such as a parking boundary line 100 or an obstacle including an other-vehicle 300. In addition, the parking region detection unit 201 detects the separation distance from the own-vehicle 1 to an obstacle including an other-vehicle 300, the separation distance between obstacles, or the like based on the result of detection by each sonar 90. The parking region detection unit 201 detects one or a plurality of parking spaces 110 based on the parking boundary line 100, the separation distance to the other-vehicle 300, or the like thus detected. Then, the parking region detection unit 201 specifies, as a parking-possible space 210, any parking space 110 having an area larger than that of the own-vehicle 1.

In the flowchart in FIG. 4, the parking region detection unit 201 determines whether any parking-possible space 210 is detected (step SA3). When having determined that no parking-possible space 210 is detected (NO at step SA3), the parking region detection unit 201 performs detection of any parking-possible space 210 again.

When the parking region detection unit 201 has determined that any parking-possible space 210 is detected (YES at step SA3), the candidate region selection unit 202 executes selection processing (step SA4).

Figure 5:
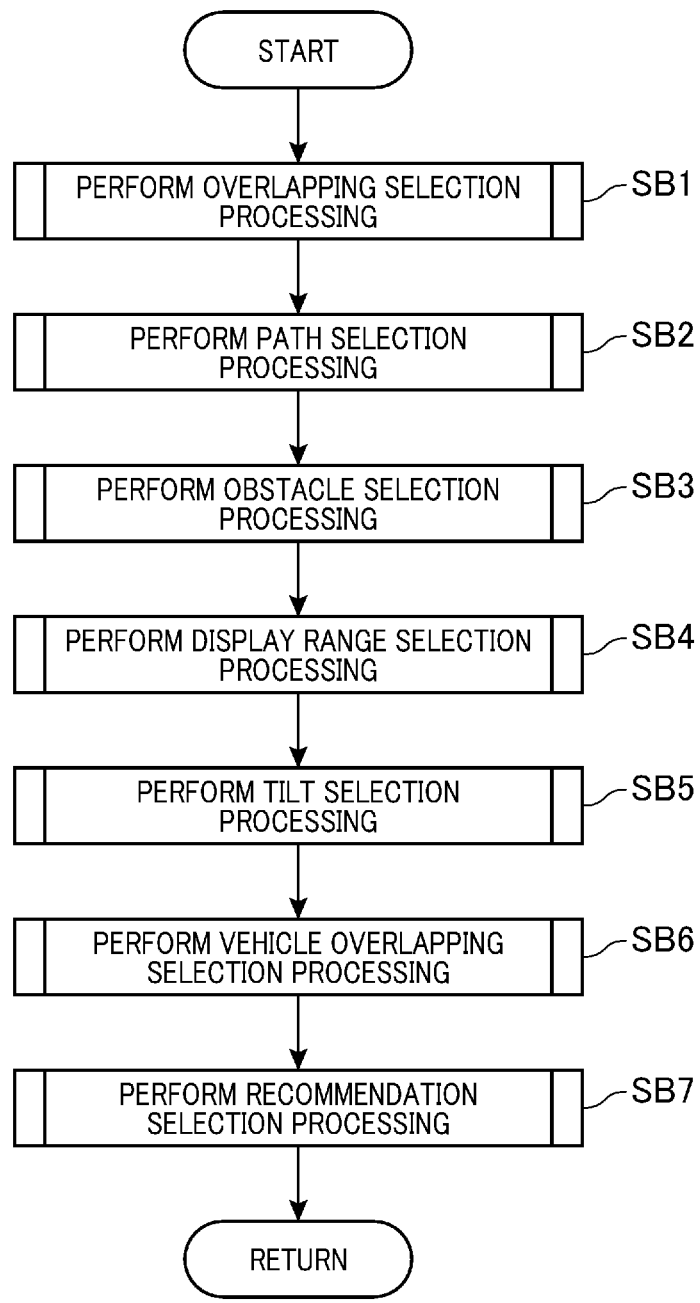
FIG. 5 is a flowchart illustrating the operation of the parking assistance device in selection processing.

FIG. 5 is a flowchart illustrating the operation of the parking assistance device 2 in the selection processing.

The selection processing is processing of selecting a parking candidate space (parking candidate region) in which is a parking candidate of the own-vehicle 1 among the parking-possible spaces 210 detected at step SA2.

The candidate region selection unit 202 executes overlapping selection processing (step SB1).

Figure 6:
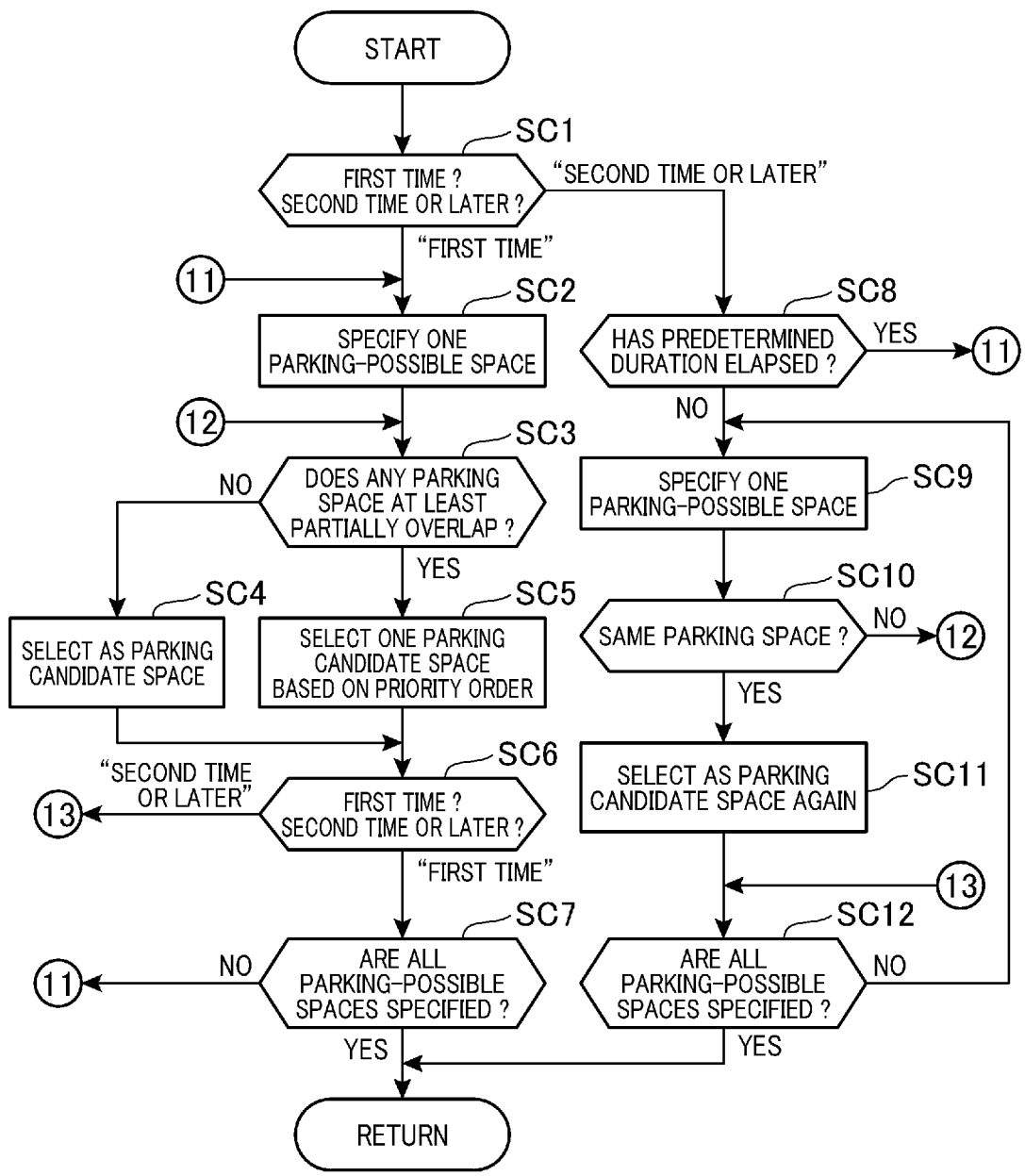
FIG. 6 is a flowchart illustrating the operation of the parking assistance device in overlapping selection processing.

FIG. 6 is a flowchart illustrating the operation of the parking assistance device 2 in the overlapping selection processing.

The candidate region selection unit 202 determines whether the current overlapping selection processing is the first time processing or the second time or later processing (step SC1). When having determined the current overlapping selection processing is the second time or later processing ("SECOND OR LATER" at step SC1), the candidate region selection unit 202 executes processing at step SC8. The processing at step SC8 will be described later.

When having determined that the current overlapping selection processing is the first time processing ("FIRST TIME" at step SC1), the candidate region selection unit 202 specifies one parking-possible space 210 among the one or plurality of parking-possible spaces 210 detected by the parking region detection unit 201 at step SA2 (step SC2).

Then, the candidate region selection unit 202 determines whether any parking-possible space 210 at least partially overlaps with the specified parking-possible space 210 (step SC3). When having determined that no parking-possible space 210 at least partially overlaps with the parking-possible space 210 specified at step SC2 (NO at step SC3), the candidate region selection unit 202 selects the parking-possible space 210 specified at step SC2 as a parking candidate space (step SC4).

When having determined that any parking-possible space 210 at least partially overlaps with the specified parking-possible space 210 (YES at step SC3), the candidate region selection unit 202 selects one parking-possible space 210 as a parking candidate space based on a predetermined priority order (step SC5).

Step SC5 will be described below in detail.

Figure 7:
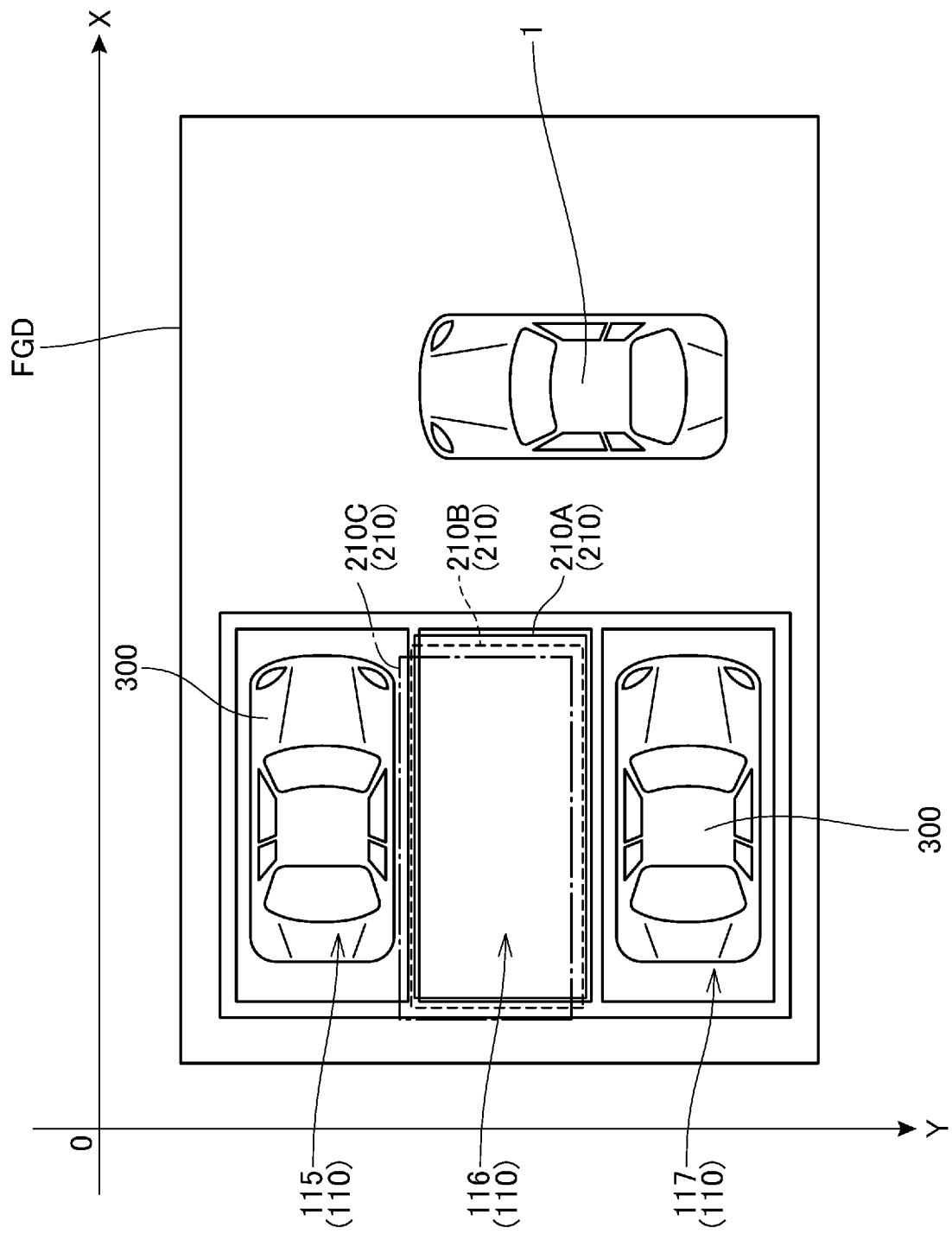
FIG. 7 is a diagram for description of the overlapping selection processing.

FIG. 7 is a diagram for description of the overlapping selection processing.

The candidate region selection unit 202 executes the overlapping selection processing based on the panoramic image data FGD loaded onto the predetermined coordinate system.

The panoramic image represented by the panoramic image data FGD in FIG. 7 includes the own-vehicle 1 and parking spaces 115, 116, and 117 positioned on the left side of the own-vehicle 1. The parking spaces 115 and 117 have other-vehicles 300 existing in their regions. The parking space 116 has no other-vehicle 300 existing in its region.

The parking region detection unit 201 detects a parking-possible space 210 corresponding to the parking space 116 by a plurality of methods at step SA2. Specifically, the parking region detection unit 201 detects the parking-possible space 210 based on only the parking boundary line 100 in results of image capturing by the external image capturing cameras 80. Hereinafter, this detection method is referred to as a first detection method. In addition, the parking region detection unit 201 detects the parking-possible space 210 based on only results of detection by the sonars 90. Hereinafter, this detection method is referred to as a second detection method. The parking region detection unit 201 detects the parking-possible space 210 based on the results of image capturing by the external image capturing cameras 80 and the results of detection by the sonars 90. Hereinafter, this detection method is referred to as a third detection method. In FIG. 7, a parking-possible space 210A illustrated with solid lines is the parking-possible space 210 detected by the first detection method. In FIG. 7, a parking-possible space 210B illustrated with dotted lines is the parking-possible space 210 detected by the second detection method. In FIG. 7, a parking-possible space 210C illustrated with dashed and single-dotted lines is the parking-possible space 210 detected by the third detection method.

The candidate region selection unit 202 further specifies the parking-possible spaces 210B and 210C at least partially overlapping with each other, for example, when the parking-possible space 210A is specified at step SC2. The candidate region selection unit 202 can easily determine the existence of overlapping based on coordinates of the coordinate system onto which the panoramic image data FGD is loaded. Then, the candidate region selection unit 202 selects, as a parking candidate space, the parking-possible space 210 detected by a detection method at the highest selection priority order among the detection methods of the parking-possible spaces 210A, 210B, and 210C. The priority order is predetermined in terms of the accuracy of matching with the actual parking spaces 110 and stored as information in the storage unit 21 or the like. When the predetermined priority order is the order of the first detection method, the second detection method, and the third detection method, the candidate region selection unit 202 selects the parking-possible space 210A as a parking candidate space.

In this manner, the candidate region selection unit 202 selects a parking candidate space based on the predetermined priority order when the parking region detection unit 201 has detected parking-possible spaces 210 at least partially overlapping with each other. Accordingly, the candidate region selection unit 202 can accurately select a parking candidate spaces appropriate for the actual parking spaces 110.

As illustrated in FIG. 6, the candidate region selection unit 202 determines whether the current overlapping selection processing is the first time processing or the second time or later processing (step SC6). When having determined that the current overlapping selection processing is the second time or later processing ("SECOND OR LATER" at step SC6), the candidate region selection unit 202 forwards the processing to step SC12.

When having determined that the current overlapping selection processing is the first time processing ("FIRST TIME" at step SC6), the candidate region selection unit 202 determines whether all parking-possible spaces 210 are specified at step SC2 (step SC7). When having determined that not all parking-possible spaces 210 are specified at step SC2 (NO at step SC7), the candidate region selection unit 202 specifies a parking-possible space 210 yet to be specified and executes the processing at step SC2 and later. When having determined that all parking-possible spaces 210 are specified at step SC2 (YES at step SC7), the candidate region selection unit 202 ends the overlapping selection processing.

As illustrated in FIG. 5, after having executed the overlapping selection processing, the candidate region selection unit 202 executes path selection processing (step SB2).

Figure 8:
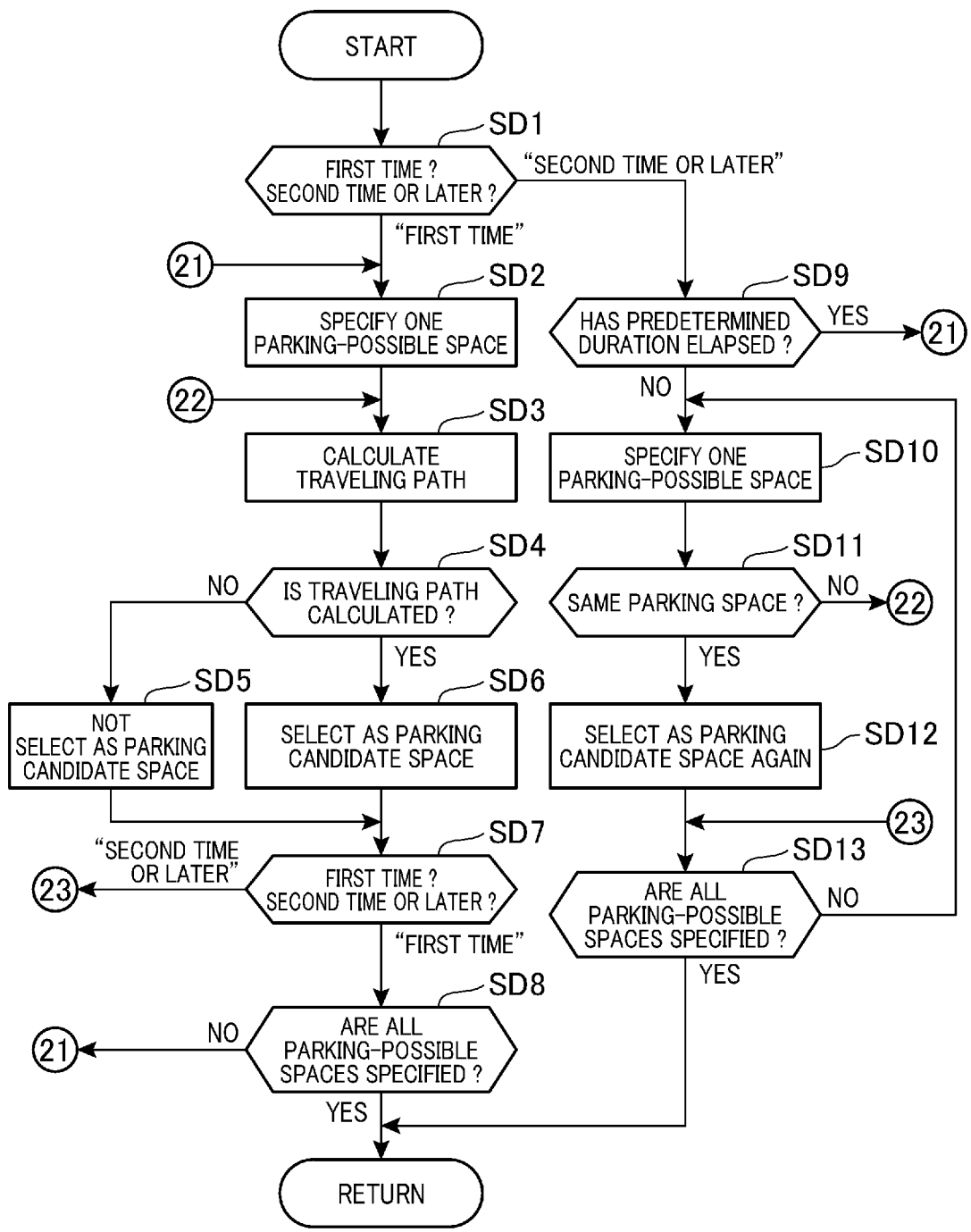
FIG. 8 is a flowchart illustrating the operation of the parking assistance device in path selection processing.

FIG. 8 is a flowchart illustrating the operation of the parking assistance device 2 in the path selection processing.

The candidate region selection unit 202 determines whether the current path selection processing is the first time processing or the second time or later processing (step SD1). When having determined that the current path selection processing is the second time or later processing ("SECOND OR LATER" at step SD1), the candidate region selection unit 202 executes processing at step SD9. The processing at step SD9 will be described later.

When having determined that the current path selection processing is the first time processing ("FIRST TIME" at step SD1), the candidate region selection unit 202 specifies one parking-possible space 210 among one or a plurality of parking-possible spaces 210 selected as parking candidate spaces in the overlapping selection processing (step SD2).

Then, the candidate region selection unit 202 causes the path calculation unit 203 to calculate a traveling path from the current position of the own-vehicle 1 to the parking-possible space 210 specified at step SD2 (step SD3). The path calculation unit 203 calculates the traveling path based on the current position of the own-vehicle 1 specified by the current position specification unit 205, the position of any obstacle including an other-vehicle 300, which is detected by the external image capturing cameras 80 and the sonars 90, and the position of the parking-possible space 210 specified at step SD2. The obstacle means an object that interferes with parking of the own-vehicle 1. The calculation may be performed by a method of an existing technology.

Then, the candidate region selection unit 202 determines whether the traveling path is calculated by the path calculation unit 203 (step SD4). When having determined that the traveling path is not calculated by the path calculation unit 203 (NO at step SD4), the candidate region selection unit 202 does not select, as a parking candidate space, the parking-possible space 210 specified at step SD2 (step SD5). When having determined that the traveling path is calculated by the path calculation unit 203 (YES at step SD4), the candidate region selection unit 202 selects, as a parking candidate space, the parking-possible space 210 specified at step SD2 (step SD6).

In this manner, the candidate region selection unit 202 selects, as a parking candidate space, a parking-possible space 210 for which the traveling path is calculated among parking-possible spaces 210 detected by the parking region detection unit 201. Accordingly, the candidate region selection unit 202 can accurately select a parking candidate space into which the own-vehicle 1 can travel at parking. Moreover, the candidate region selection unit 202 narrows parking-possible spaces 210 among which the parking candidate space is to be selected after the overlapping selection processing, and thus can more accurately select the parking candidate space.

Then, the candidate region selection unit 202 determines whether the current path selection processing is the first time processing or the second time or later processing (step SD7). When having determined that the current path selection processing is the second time or later processing ("SECOND OR LATER" at step SD7), the candidate region selection unit 202 forwards the processing to step SD13.

When having determined that the current path selection processing is the first time processing ("FIRST TIME" at step SD7), the candidate region selection unit 202 determines whether all parking-possible spaces 210 are specified at step SD2 (step SD8). When having determined that not all parking-possible spaces 210 are specified at step SD2 (NO at step SD8), the candidate region selection unit 202 specifies a parking-possible space 210 yet to be specified and executes the processing at step SD2 and later. When having determined that all parking-possible spaces 210 are specified at step SD2 (YES at step SD8), the candidate region selection unit 202 ends the path selection processing.

As illustrated in FIG. 5, after having executed the path selection processing, the candidate region selection unit 202 executes obstacle selection processing (step SB3).

Figure 9:
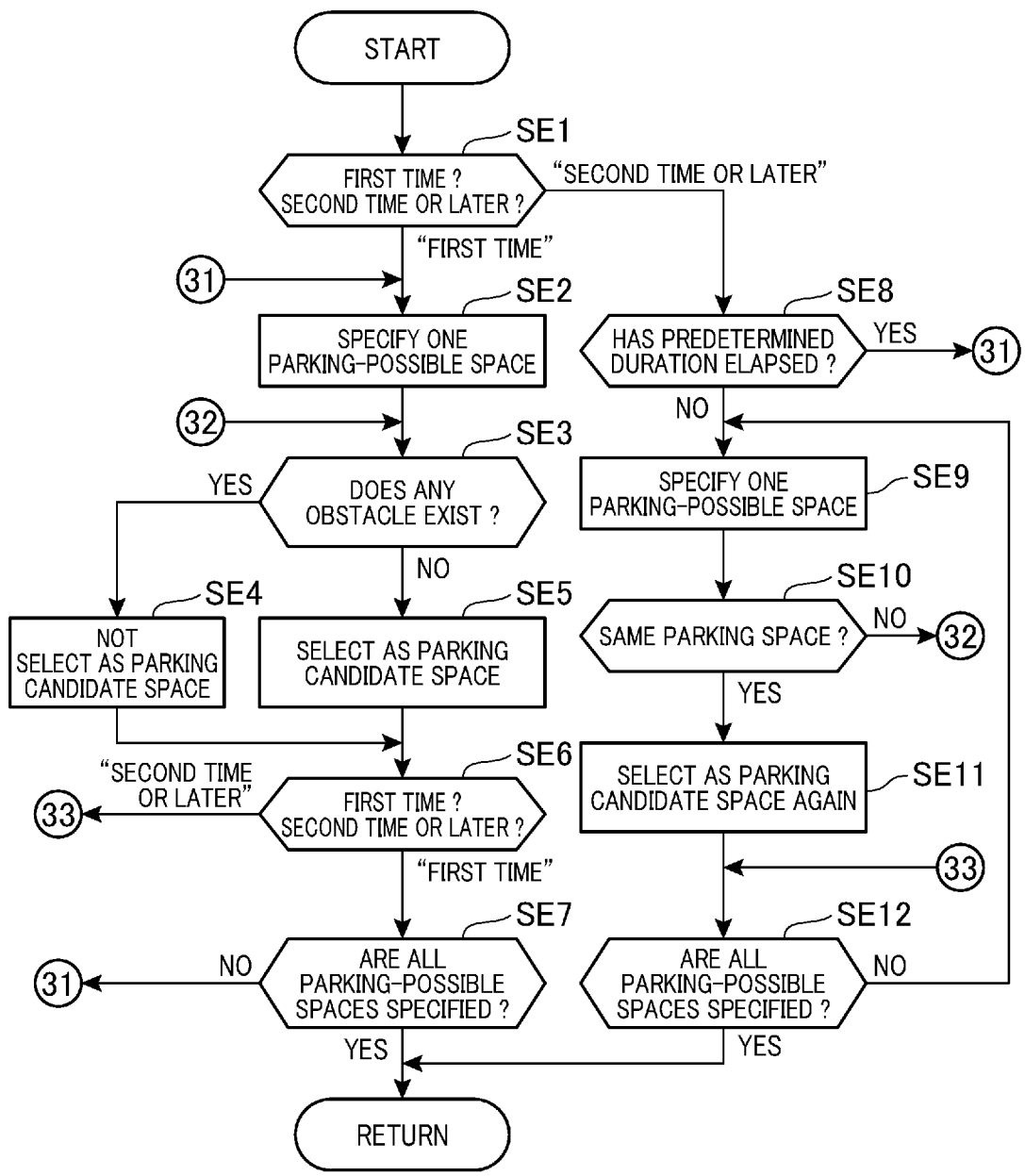
FIG. 9 is a flowchart illustrating the operation of the parking assistance device in obstacle selection processing.

FIG. 9 is a flowchart illustrating the operation of the parking assistance device 2 in the obstacle selection processing.

The candidate region selection unit 202 determines whether the current obstacle selection processing is the first time processing or the second time or later processing (step SE1). When having determined that the current obstacle selection processing is the second time or later processing ("SECOND OR LATER" at step SE1), the candidate region selection unit 202 executes processing at step SE8. The processing at step SE8 will be described later.

When having determined that the current obstacle selection processing is the first time processing ("FIRST TIME" at step SE1), the candidate region selection unit 202 specifies one parking-possible space 210 among the one or plurality of parking-possible spaces 210 selected as parking candidate spaces in the path selection processing (step SE2).

Then, the candidate region selection unit 202 determines whether any obstacle including an other-vehicle 300 exists in the parking-possible space 210 specified at step SE2 (step SE3). The candidate region selection unit 202 determines whether such an obstacle exists based on the results of detection by the sonars 90 and the panoramic image represented by the generated panoramic image data FGD. The candidate region selection unit 202 can easily perform the determination at step SE3 by specifying the position of the obstacle based on the panoramic image data FGD loaded onto the predetermined coordinate system.

When having determined that an obstacle including an other-vehicle 300 existing in the parking-possible space 210 specified at step SE2 (YES at step SE3), the candidate region selection unit 202 does not select, as a parking candidate space, the parking-possible space 210 specified at step SE2 (step SE4). When having determined that no obstacle including an other-vehicle 300 exists in the parking-possible space 210 specified at step SE2 (NO at step SE3), the candidate region selection unit 202 selects, as a parking candidate space, the parking-possible space 210 specified at step SE2 (step SE5).

In this manner, the candidate region selection unit 202 selects, as a parking candidate space, a parking-possible space 210 having no obstacle including an other-vehicle 300 detected nor existing in its region among parking-possible spaces 210 detected by the parking region detection unit 201. Accordingly, the candidate region selection unit 202 can accurately select a parking candidate space in which no obstacle including an other-vehicle 300 exists. Moreover, the candidate region selection unit 202 narrows parking-possible spaces 210 among which the parking candidate space is to be selected after the path selection processing, and thus can more accurately select the parking candidate space.

Then, the candidate region selection unit 202 determines whether the current obstacle selection processing is the first time processing or the second time or later processing (step SE6). When having determined that the current obstacle selection processing is the second time or later processing ("SECOND OR LATER" at step SE6), the candidate region selection unit 202 forwards the processing to step SE12.

When having determined that the current obstacle selection processing is the first time processing ("FIRST TIME" at step SE6), the candidate region selection unit 202 determines whether all parking-possible spaces 210 are specified at step SE2 (step SE7). When having determined that not all parking-possible spaces 210 are specified at step SE2 (NO at step SE7), the candidate region selection unit 202 specifies a parking-possible space 210 yet to be specified and executes the processing at step SE2 and later. When having determined that all parking-possible spaces 210 are specified at step SE2 (YES at step SE7), the candidate region selection unit 202 ends the obstacle selection processing.

As illustrated in FIG. 5, after having executed the obstacle selection processing, the candidate region selection unit 202 executes display range selection processing (step SB4).

Figure 10:
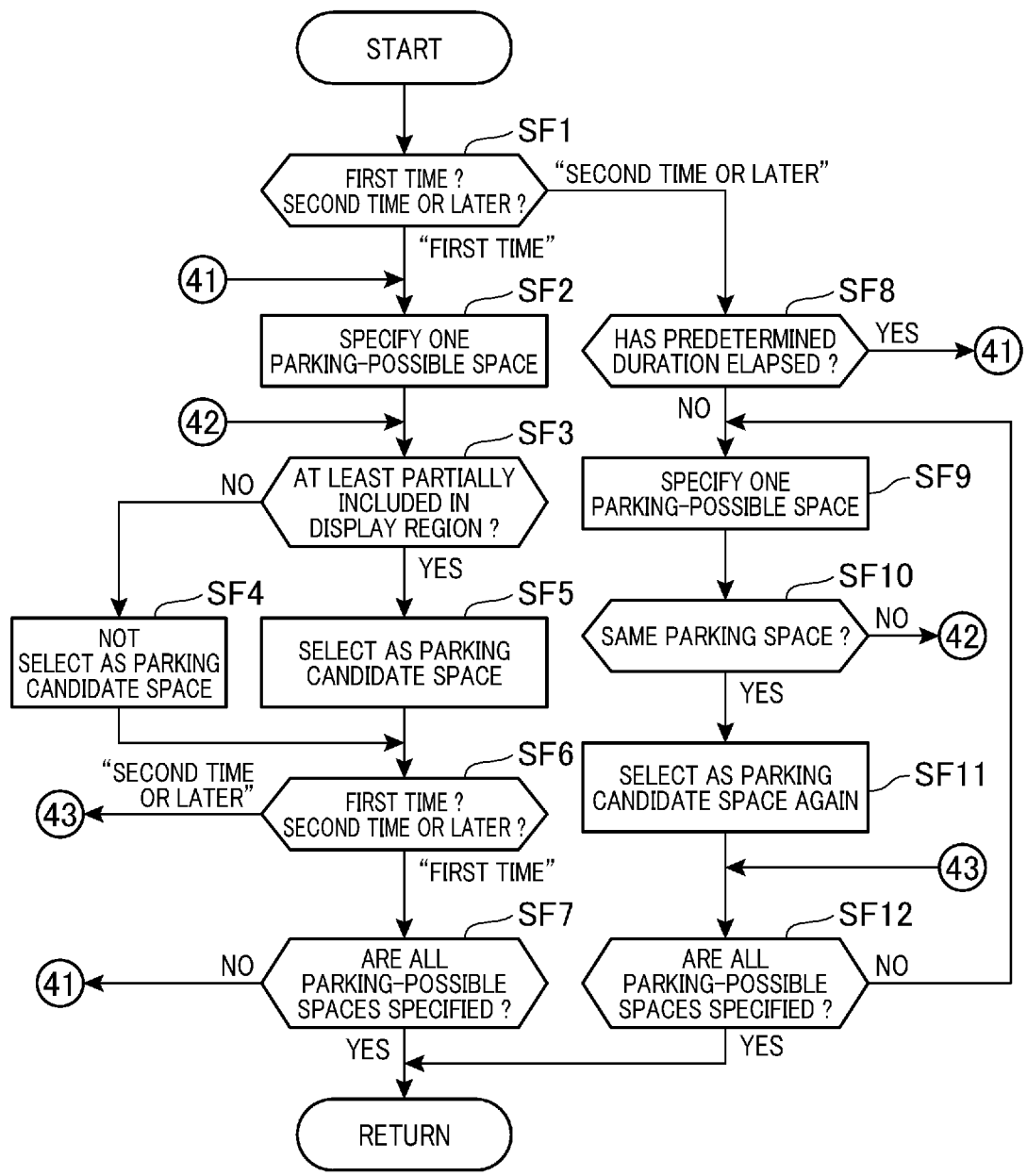
FIG. 10 is a flowchart illustrating the operation of the parking assistance device in display range selection processing.

FIG. 10 is a flowchart illustrating the operation of the parking assistance device 2 in the display range selection processing.

The candidate region selection unit 202 determines whether the current display range selection processing is the first time processing or the second time or later processing (step SF1). When having determined that the current display range selection processing is the second time or later processing ("SECOND OR LATER" at step SF1), the candidate region selection unit 202 executes processing at step SF8. The processing at step SF8 will be described later.

When having determined that the current display range selection processing is the first time processing ("FIRST TIME" at step SF1), the candidate region selection unit 202 specifies one parking-possible space 210 among the one or plurality of parking-possible spaces 210 selected as parking candidate spaces in the obstacle selection processing (step SF2).

Then, the candidate region selection unit 202 determines whether the parking-possible space 210 specified at step SF2 is at least partially included in the display region 71A of the touch panel 7 (step SF3).

Step SF3 will be described in detail below.

Figure 11:
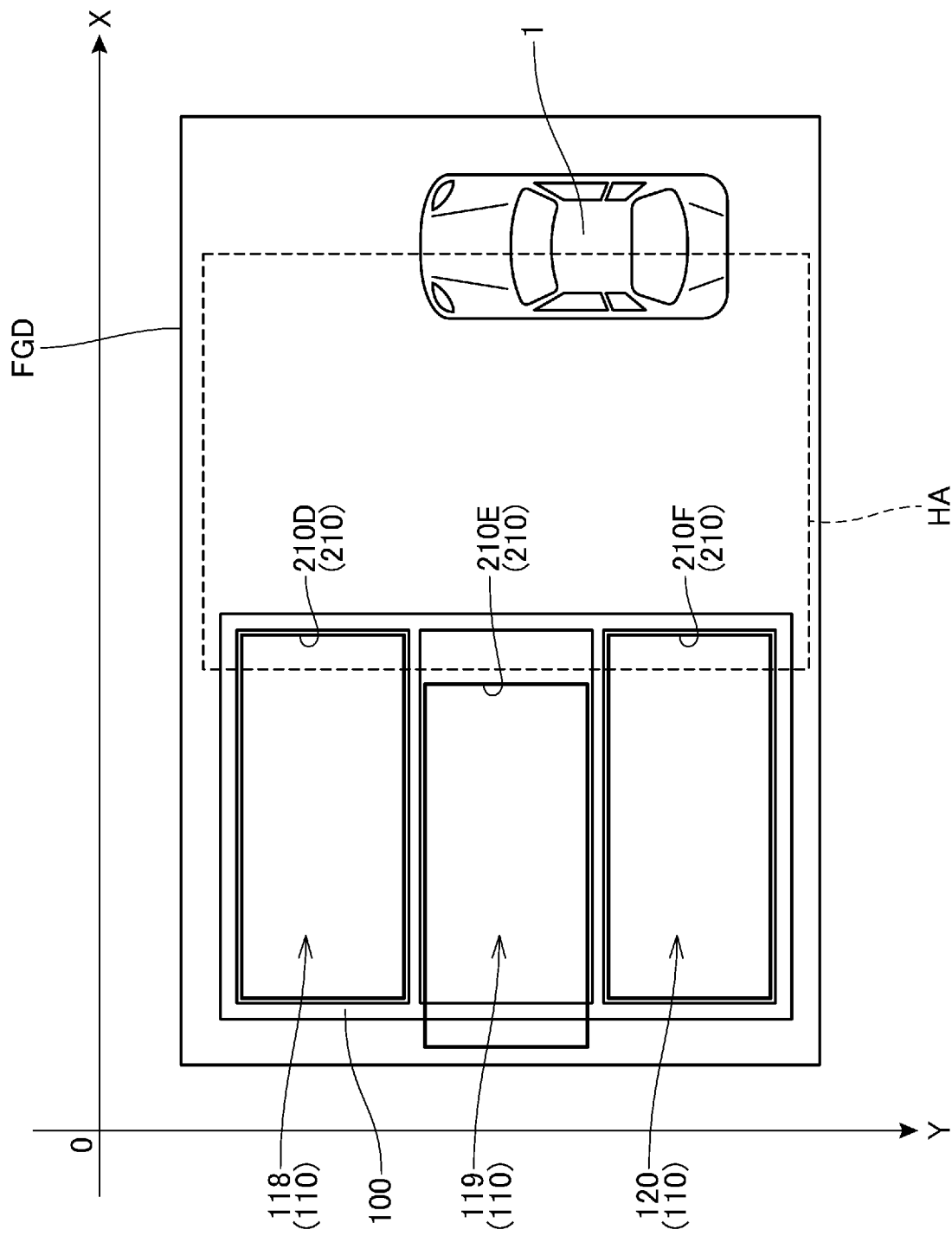
FIG. 11 is a diagram for description of the display range selection processing.

FIG. 11 is a diagram for description of the display range selection processing.

The candidate region selection unit 202 executes the display range selection processing based on the panoramic image data FGD loaded onto the predetermined coordinate system.

The panoramic image represented by the panoramic image data FGD in FIG. 11 includes the own-vehicle 1 and parking spaces 118, 119, and 120 positioned on the left side of the own-vehicle 1. The parking spaces 118, 119, and 120 have no other-vehicle 300 existing in their regions.

FIG. 11 illustrates parking-possible spaces 210D, 210E, and 210F selected as parking candidate spaces in the obstacle selection processing. Parts of the parking-possible spaces 210D and 210F are included in a display range HA. The parking-possible space 210E is positioned in the negative X direction with respect to the display range HA, and no part thereof is included in the display range HA. The display range HA is a region in a predetermined coordinate system corresponding to the display region 71A and is predetermined through test, simulation, or the like in advance.

For example, when the parking-possible space 210D or the parking-possible space 210F is specified at step SF2, the candidate region selection unit 202 determines that at least part thereof is included in the display range HA (YES at step SF3). For example, when the parking-possible space 210E is specified at step SF2, the candidate region selection unit 202 determines that no part thereof is included in the display range HA (NO at step SF3). The determination of whether each parking-possible space is included in the display range HA is determination of whether the parking-possible space is included in the display region 71A of the touch panel 7.

As illustrated in FIG. 10, When having determined that a parking-possible space 210 specified at step SF2 is not included in the display region 71A of the touch panel 7 (NO at step SF3), the candidate region selection unit 202 does not select, as a parking candidate space, the parking-possible space 210 specified at step SF2 (step SF4). When having determined that the parking-possible space 210 specified at step SF2 is at least partially included in the display region 71A of the touch panel 7 (YES at step SF3), the candidate region selection unit 202 selects, as a parking candidate space, the parking-possible space 210 specified at step SF2 (step SF5).

In this manner, the candidate region selection unit 202 selects, as a parking candidate space, a parking-possible space 210 at least partially included in the display region 71A of the touch panel 7 among parking-possible spaces 210 detected by the parking region detection unit 201. Accordingly, the candidate region selection unit 202 can accurately select a parking candidate space to be displayed on the touch panel 7. Moreover, the candidate region selection unit 202 narrows parking-possible spaces 210 among which the parking candidate space is to be selected after the obstacle selection processing, and thus can more accurately select the parking candidate space.

Then, the candidate region selection unit 202 determines whether the current display range selection processing is the first time processing or the second time or later processing (step SF6). When having determined that the current display range selection processing is the second time or later processing ("SECOND OR LATER" at step SF6), the candidate region selection unit 202 forwards the processing to step SF12.

When having determined that the current display range selection processing is the first time processing ("FIRST TIME" at step SF6), the candidate region selection unit 202 determines whether all parking-possible spaces 210 are specified at step SF2 (step SF7). When having determined that not all parking-possible spaces 210 are specified at step SF2 (NO at step SF7), the candidate region selection unit 202 specifies a parking-possible space 210 yet to be specified and executes the processing at step SF2 and later. When having determined that all parking-possible spaces 210 are specified at step SF2 (YES at step SF7), the candidate region selection unit 202 ends the display range selection processing.

As illustrated in FIG. 5, after having executed the display range selection processing, the candidate region selection unit 202 executes tilt selection processing (step SB5).

Figure 12:
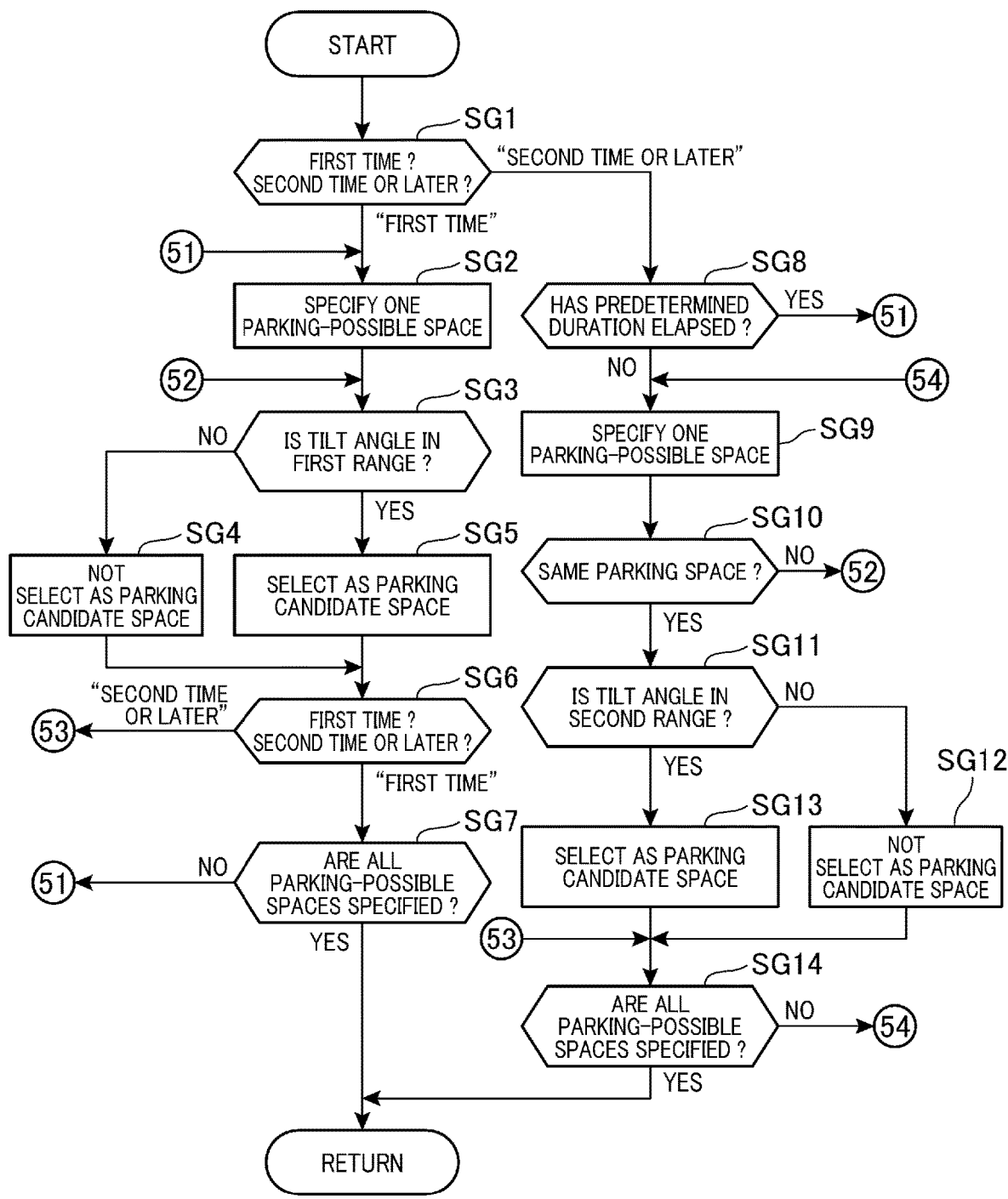
FIG. 12 is a flowchart illustrating the operation of the parking assistance device in tilt selection processing.

FIG. 12 is a flowchart illustrating the operation of the parking assistance device 2 in the tilt selection processing.

The candidate region selection unit 202 determines whether the current tilt selection processing is the first time processing or the second time or later processing (step SG1). When having determined that the current tilt selection processing is the second time or later processing ("SECOND OR LATER" at step SG1), the candidate region selection unit 202 executes processing at step SG8. The processing at step SG8 will be described later.

When having determined that the current tilt selection processing is the first time processing ("FIRST TIME" at step SG1), the candidate region selection unit 202 specifies one parking-possible space 210 among one or a plurality of parking-possible spaces 210 selected as parking candidate spaces in the display range selection processing (step SG2).

Then, the candidate region selection unit 202 determines whether the tilt angle of the parking-possible space 210 specified at step SG2 relative to a front-back direction ZH of the own-vehicle 1 is in a first range (predetermined range) (step SG3). The first range is smaller than a second range to be described later and is predetermined through test, simulation, or the like in advance so that any parking-possible space 210 out of the range can be determined as a falsely detected parking-possible space 210.

Step SG3 will be described in detail below.

FIG. 3 is a diagram for description of the tilt selection processing.

The candidate region selection unit 202 executes the tilt selection processing based on the panoramic image data FGD loaded onto the predetermined coordinate system.

Figure 13:
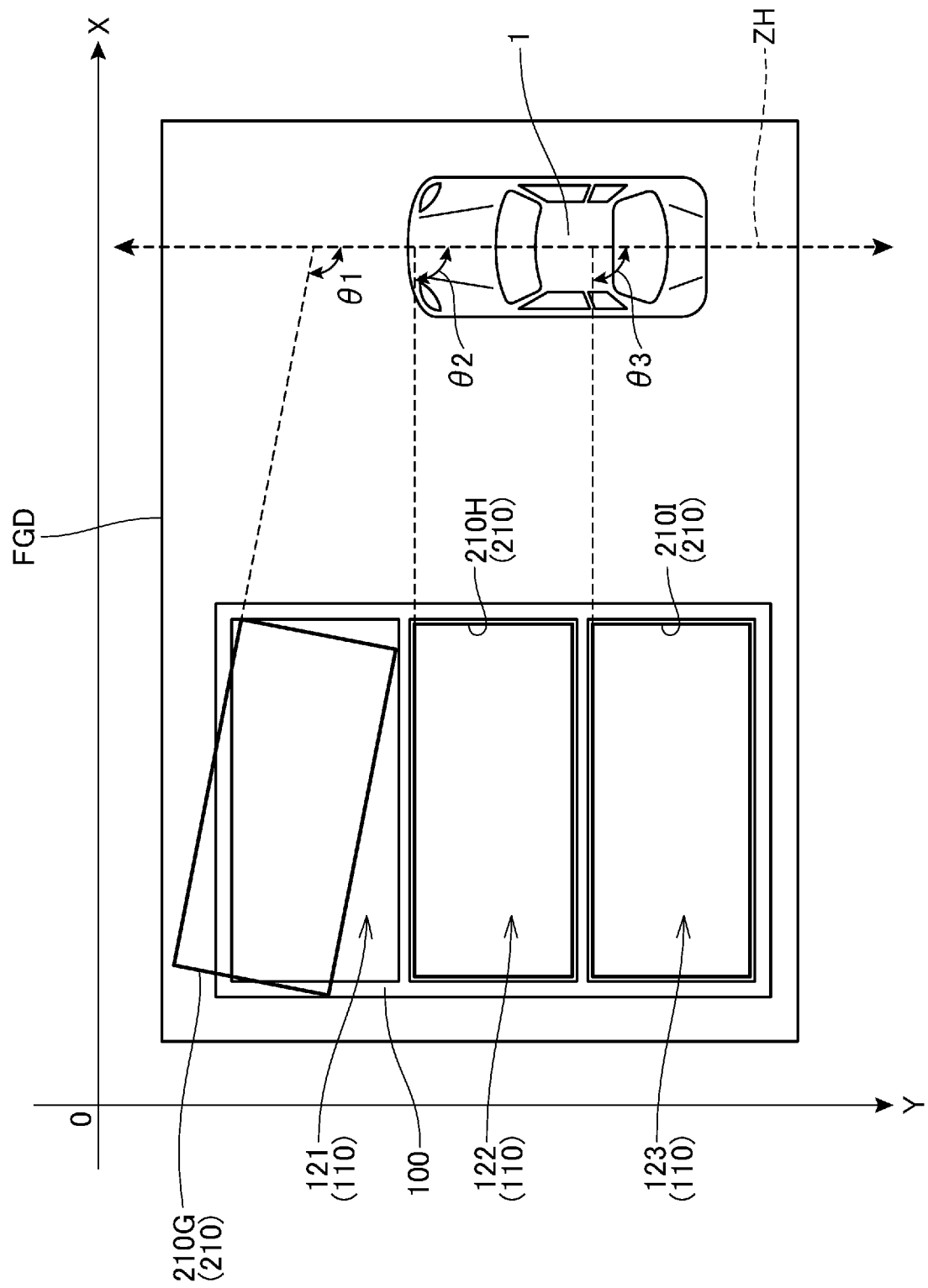
FIG. 13 is a diagram for description of the tilt selection processing.

The panoramic image represented by the panoramic image data FGD in FIG. 13 includes the own-vehicle 1 and parking spaces 121, 122, and 123 positioned on the left side of the own-vehicle 1. The parking spaces 121, 122, and 123 have no other-vehicle 300 existing in their regions.

FIG. 13 illustrates parking-possible spaces 210G, 210H, and 210I selected as parking candidate spaces in the display range selection processing. In FIG. 13, the parking-possible space 210G is tilted as compared to the parking-possible spaces 210H and 210I due to false detection by the parking region detection unit 201.

The candidate region selection unit 202 specifies a line segment positioned farthest in the negative Y direction among line segments forming the region of the parking-possible space 210 specified at step SG2. Then, the candidate region selection unit 202 determines whether the angle of the specified line segment relative to the front-back direction ZH of the own-vehicle 1 is in the first range. In the drawing, angle θ1 is out of the first range, and angles θ2 and θ3 are in the first range. In this case, at step SG2, the candidate region selection unit 202 performs negative determination for the parking-possible space 210G and performs positive determination for the parking-possible spaces 210H and 210I.

As illustrated in FIG. 12, when having determined that the tilt angle of the parking-possible space 210 specified at step SG2 relative to the front-back direction ZH of the own-vehicle 1 is not in the first range (NO at step SG3), the candidate region selection unit 202 does not select, as a parking candidate space, the parking-possible space 210 specified at step SG2 (step SG4). When having determined that the tilt angle of the parking-possible space 210 specified at step SG2 relative to the front-back direction ZH of the own-vehicle 1 is in the first range (YES at step SG3), the candidate region selection unit 202 selects, as a parking candidate space, the parking-possible space 210 specified at step SG2 (step SG5).

In this manner, the candidate region selection unit 202 selects, as a parking candidate space, a parking-possible space 210, the tilt of which relative to the front-back direction ZH of the own-vehicle 1 is in the first range among parking-possible spaces 210 detected by the parking region detection unit 201. Accordingly, the candidate region selection unit 202 does not select a falsely detected parking-possible space 210 as a parking candidate space, and thus can accurately select a parking candidate space. Moreover, the candidate region selection unit 202 narrows parking-possible spaces 210 among which the parking candidate space is to be selected after the display range selection processing, and thus can more accurately select the parking candidate space.

Then, the candidate region selection unit 202 determines whether the current tilt selection processing is the first time processing or the second time or later processing (step SG6). When having determined that the current tilt selection processing is the second time or later processing ("SECOND OR LATER" at step SG6), the candidate region selection unit 202 forwards the processing to step SG14.

When having determined that the current tilt selection processing is the first time processing ("FIRST TIME" at step SG6), the candidate region selection unit 202 determines whether all parking-possible spaces 210 are specified at step SG2 (step SG7). When having determined that not all parking-possible spaces 210 are specified at step SG2 (NO at step SG7), the candidate region selection unit 202 specifies a parking-possible space 210 yet to be specified and executes the processing at step SG2 and later. When having determined that all parking-possible spaces 210 are specified at step SG2 (YES at step SG7), the candidate region selection unit 202 ends the tilt selection processing.

As illustrated in FIG. 5, after having executed the tilt selection processing, the candidate region selection unit 202 executes vehicle overlapping selection processing (step SB6).

Figure 14:
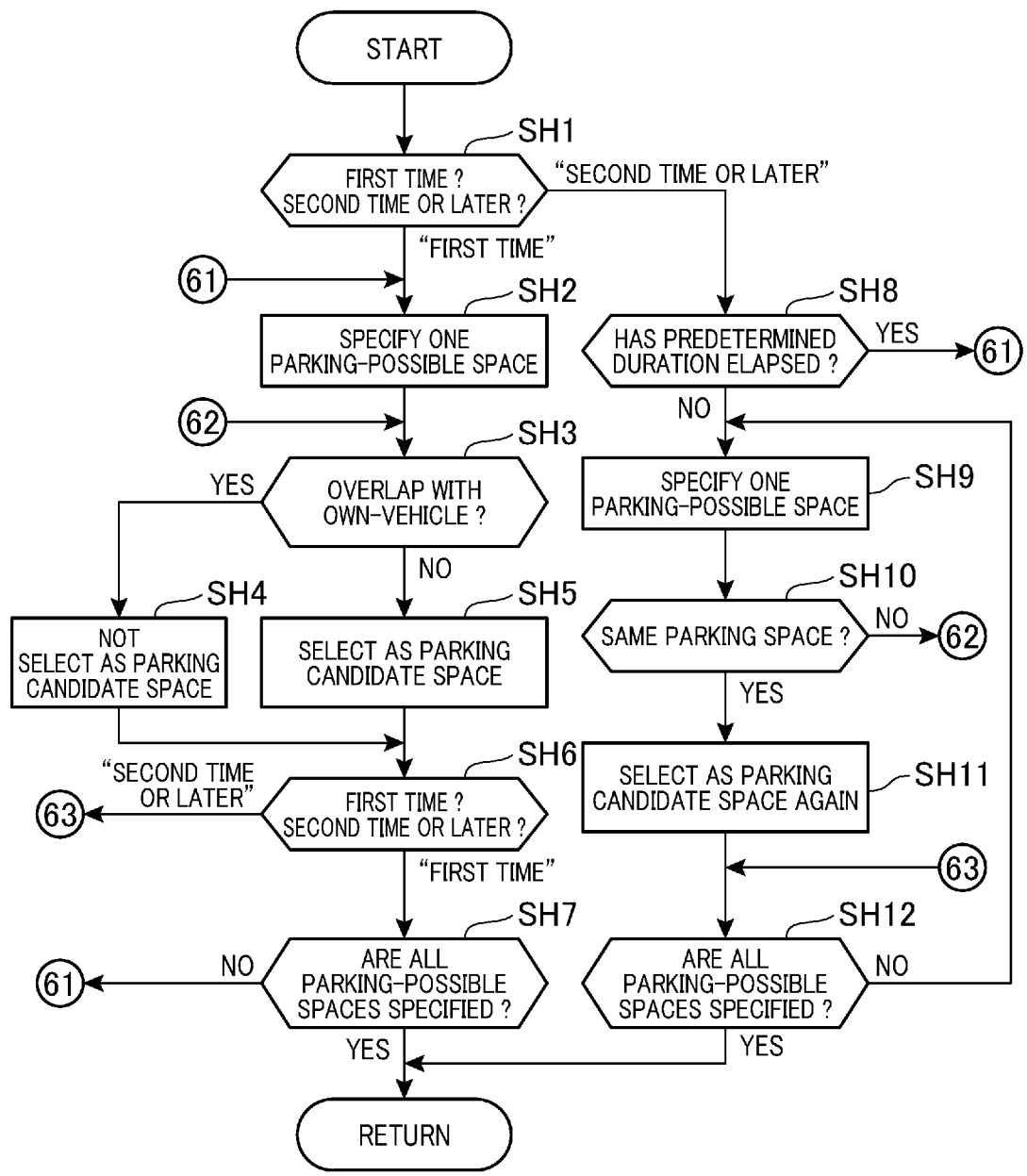
FIG. 14 is a flowchart illustrating the operation of the parking assistance device in vehicle overlapping selection processing.

FIG. 14 is a flowchart illustrating the operation of the parking assistance device 2 in the vehicle overlapping selection processing.

The candidate region selection unit 202 determines whether the current vehicle overlapping selection processing is the first time processing or the second time or later processing (step SH1). When having determined that the current vehicle overlapping selection processing is the second time or later processing ("SECOND OR LATER" at step SH1), the candidate region selection unit 202 executes processing at step SH8. The processing at step SH8 will be described later.

When having determined that the current vehicle overlapping selection processing is the first time processing ("FIRST TIME" at step SH1), the candidate region selection unit 202 specifies one parking-possible space 210 among one or a plurality of parking-possible spaces 210 selected as parking candidate spaces in the tilt selection processing (step SH2).

Then, the candidate region selection unit 202 determines whether the parking-possible space 210 specified at step SH2 overlaps with the own-vehicle 1 (step SH3).

Step SH3 will be described in detail below.

Figure 15:
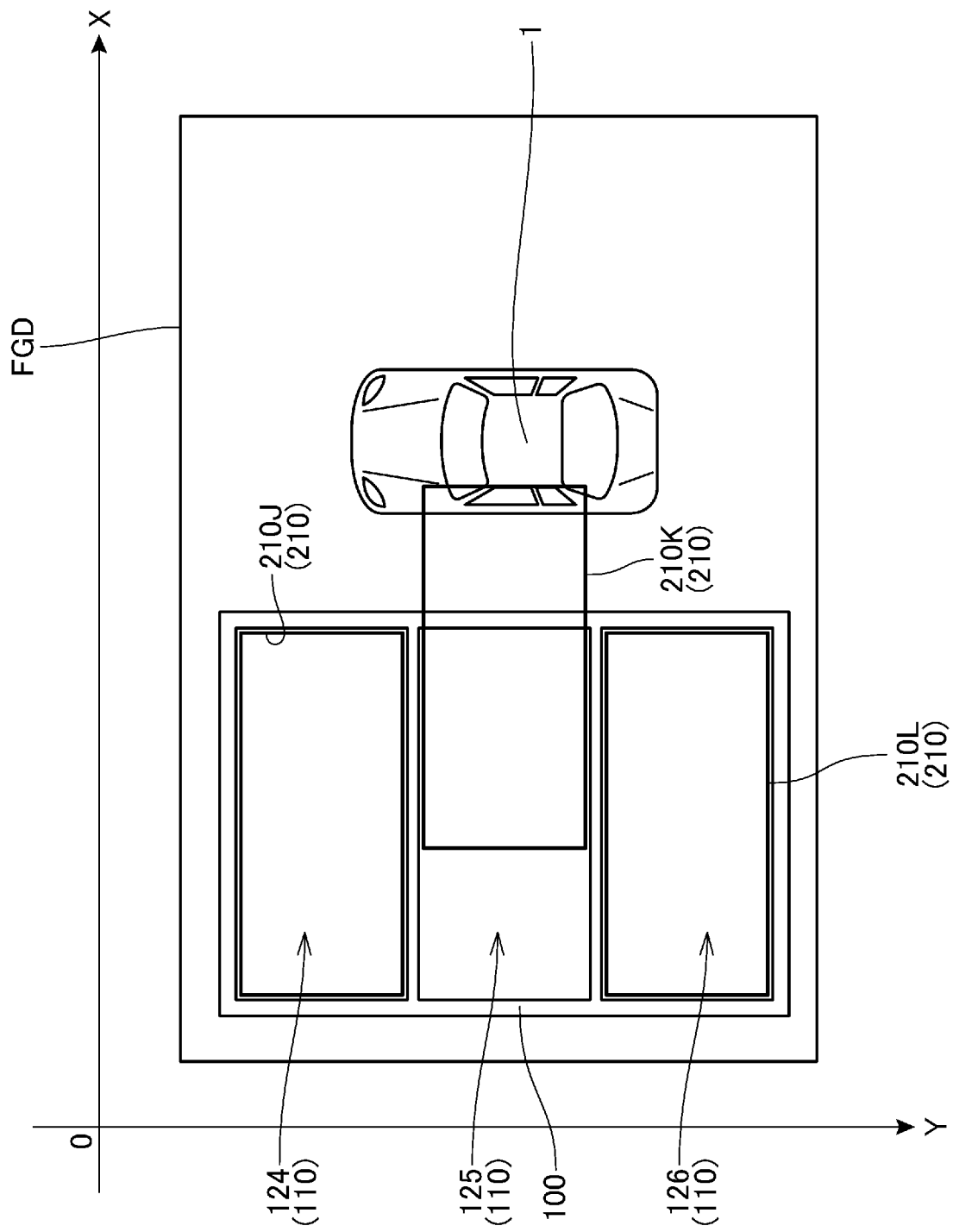
FIG. 15 is a diagram for description of the vehicle overlapping selection processing.

FIG. 15 is a diagram for description of the vehicle overlapping selection processing.

The candidate region selection unit 202 executes the vehicle overlapping selection processing based on the panoramic image data FGD loaded onto the predetermined coordinate system.

The panoramic image represented by the panoramic image data FGD in FIG. 15 includes the own-vehicle 1 and parking spaces 124, 125, and 126 positioned on the left side of the own-vehicle 1. The parking spaces 124, 125, and 126 have no other-vehicle 300 existing in their regions.

FIG. 15 illustrates parking-possible spaces 210J, 210K, and 210L selected as parking candidate spaces in the tilt selection processing. In FIG. 13, due to false detection by the parking region detection unit 201, the parking-possible space 210K is shifted in the positive X direction as compared to the parking-possible spaces 210H and 210I and overlaps with the own-vehicle 1.

For example, the candidate region selection unit 202 performs positive determination at step SH3 when the parking-possible space 210K is specified at step SH2, or performs negative determination at step SH3 when the parking-possible spaces 210J and 210L are specified.

When having determined that the parking-possible space 210 specified at step SH2 overlaps with the own-vehicle 1 (YES at step SH3), the candidate region selection unit 202 does not select, as a parking candidate space, the parking-possible space 210 specified at step SH2 (step SH4). When having determined that the parking-possible space 210 specified at step SH2 overlaps with the own-vehicle 1 (NO at step SH3), the candidate region selection unit 202 selects, as a parking candidate space, the parking-possible space 210 specified at step SH2 (step SH5).

In this manner, the candidate region selection unit 202 selects, as a parking candidate space, a parking-possible space 210 not overlapping with the own-vehicle 1 among parking-possible spaces 210 detected by the parking region detection unit 201. Accordingly, the candidate region selection unit 202 does not select a falsely detected parking-possible space 210 as a parking candidate space, and thus can accurately select a parking candidate space. Moreover, the candidate region selection unit 202 narrows parking-possible spaces 210 among which the parking candidate space is to be selected after the tilt selection processing, and thus can more accurately select the parking candidate space.

Then, the candidate region selection unit 202 determines whether the current tilt selection processing is the first time processing or the second time or later processing (step SH6). When having determined that the current tilt selection processing is the second time or later processing ("SECOND OR LATER" at step SH6), the candidate region selection unit 202 forwards the processing to step SH12.

When having determined that the current vehicle overlapping selection processing is the first time processing ("FIRST TIME" at step SH6), the candidate region selection unit 202 determines whether all parking-possible spaces 210 are specified at step SH2 (step SH7). When having determined that not all parking-possible spaces 210 are specified at step SH2 (NO at step SH7), the candidate region selection unit 202 specifies a parking-possible space 210 yet to be specified and executes the processing at step SH2 and later. When having determined that all parking-possible spaces 210 are specified at step SH2 (YES at step SH7), the candidate region selection unit 202 ends the vehicle overlapping selection processing.

As illustrated in FIG. 5, after having executed the vehicle overlapping selection processing, the candidate region selection unit 202 executes recommendation selection processing (step SB7).

Figure 16:
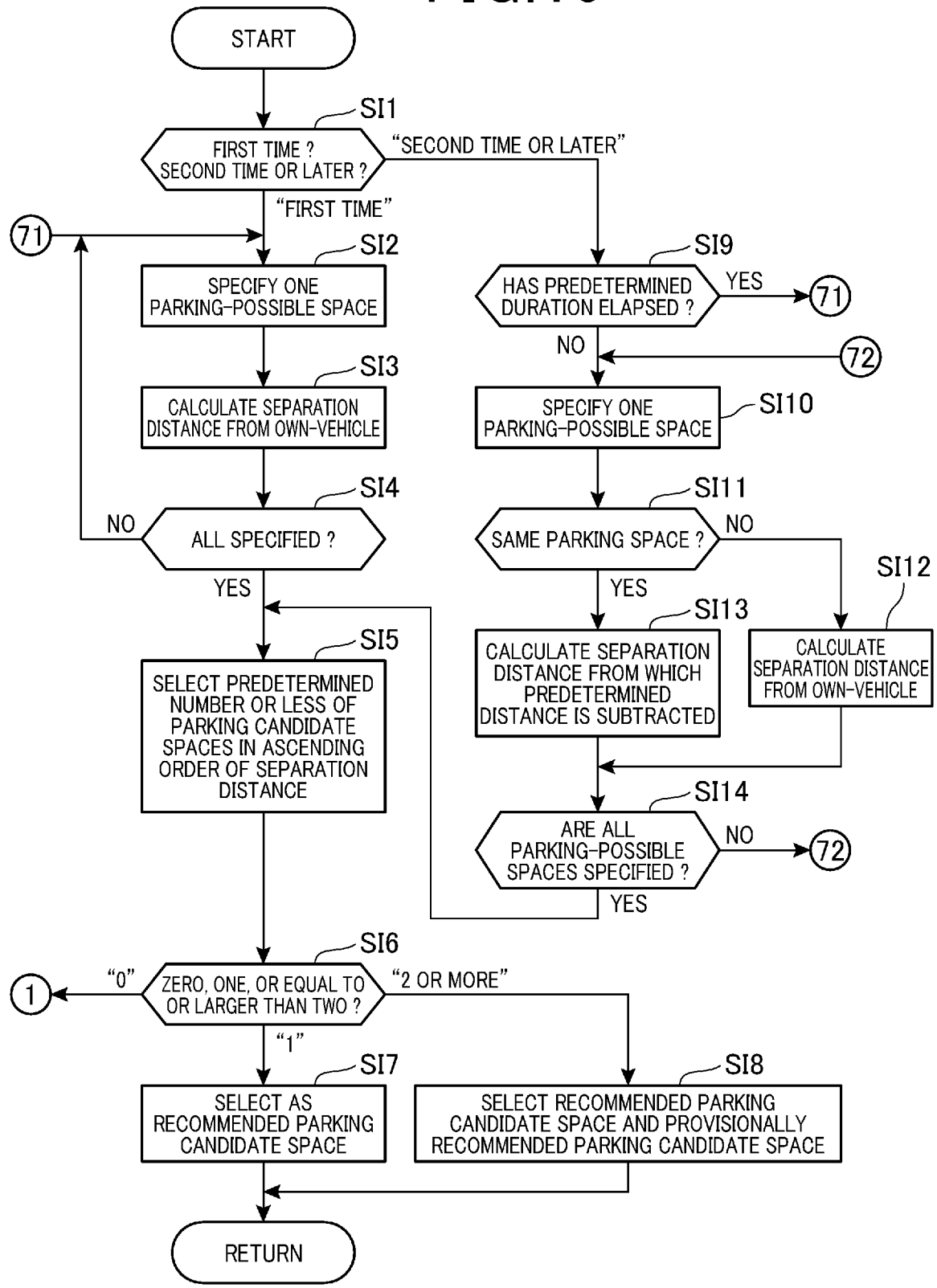
FIG. 16 is a flowchart illustrating the operation of the parking assistance device in recommendation selection processing.

FIG. 16 is a flowchart illustrating the operation of the parking assistance device 2 in the recommendation selection processing.

The candidate region selection unit 202 determines whether the current recommendation selection processing is the first time processing or the second time or later processing (step SI1). When having determined that the current recommendation selection processing is the second time or later processing ("SECOND OR LATER" at step SI1), the candidate region selection unit 202 executes processing at step SI9. The processing at step SI9 will be described later.

When having determined that the current recommendation selection processing is the first time processing ("FIRST TIME" at step SI1), the candidate region selection unit 202 specifies one parking-possible space 210 among one or a plurality of parking-possible spaces 210 selected as parking candidate spaces in the vehicle overlapping selection processing (step SI2).

Then, the candidate region selection unit 202 calculates the separation distance between the parking-possible space 210 specified at step SI2 and the own-vehicle 1 (step SI3). The candidate region selection unit 202 calculates the separation distance based on the panoramic image data FGD loaded onto the predetermined coordinate system. For example, the candidate region selection unit 202 calculates, based on coordinates, the separation distance between a position on the own-vehicle 1 and a position on the parking-possible space 210 specified at step SI2. The position on the parking-possible space 210 is, for example, its barycenter when the parking-possible space 210 is a rectangular region.

Then, the candidate region selection unit 202 determines whether all parking-possible spaces 210 are specified at step SI2 (step SI4). When having determined that not all parking-possible spaces 210 are specified at step SI2 (NO at step SI4), the candidate region selection unit 202 specifies a parking-possible space 210 yet to be specified and calculates the separation distance between the parking-possible space 210 and the own-vehicle 1. When having determined that all parking-possible spaces 210 are specified at step SI2 (YES at step SI4), the candidate region selection unit 202 selects a predetermined number or less of parking candidate spaces in the ascending order of the separation distance (step SI5).

Then, the candidate region selection unit 202 determines whether the number of parking candidate spaces selected at step SI5 is zero, one, or equal to or larger than two (step SI6).

When having determined that the number of parking candidate spaces selected at step SI5 is zero ("0" at step SI6), the candidate region selection unit 202 proceeds to step SA6 illustrated in FIG. 4. When having determined that the number of parking candidate spaces selected at step SI5 is one ("1" at step SI6), the candidate region selection unit 202 selects the parking candidate space selected at step SI5, as a parking candidate space (hereinafter referred to as a "recommended parking candidate space") (first parking candidate region) for which parking of the own-vehicle 1 is most recommended (step SI7). When having determined that the number of parking candidate spaces selected at step SI5 is equal to or larger than two ("2 OR MORE" at step SI6), the candidate region selection unit 202 selects a parking candidate space, the separation distance of which to the own-vehicle 1 is shortest as a recommended parking candidate space, and selects any other parking-possible space 210 as a provisionally recommended parking candidate space (second parking candidate region) (step SI8). The provisionally recommended parking candidate space is a parking candidate space different from and other than the recommended parking candidate space.

As illustrated in FIG. 5, after having executed the recommendation selection processing, the candidate region selection unit 202 ends the selection processing.

As illustrated in FIG. 4, the display control unit 204 causes the touch panel 7 to display the surrounding image SIG in which the recommendation parking boundary image CWG1 is superimposed on the parking-possible space 210 selected as a recommended parking candidate space in the selection processing (step SA5). In addition, the display control unit 204 causes the touch panel 7 to display the surrounding image SIG in which the recommendation parking boundary image CWG1 is superimposed on the parking-possible space 210 selected as a recommended parking candidate space and the candidate parking boundary image CWG2 is superimposed on the parking-possible space 210 selected as the provisional recommended parking candidate space (step SA5).

Then, the display control unit 204 determines whether to end the parking position display (step SA6). For example, when a parking-possible space 210 included in the surrounding image SIG displayed on the touch panel 7 is selected, the display control unit 204 determines that the parking position display is to be ended (YES at step SA6).

When the display control unit 204 has determined that the parking position display is to be ended (YES at step SA6), the control unit 20 of the parking assistance device 2 ends the present processing. When the display control unit 204 has determined that the parking position display is not to be ended (NO at step SA6), the control unit 20 executes the processing at step SA2 and later again.

[Second or Later Processing]

The following describes the operation of the parking assistance device 2 when the processing at step SA2 and later are executed for the second time or later.

As illustrated in FIG. 4, the parking region detection unit 201 detects any parking-possible space 210 based on captured images obtained by the external image capturing cameras 80 and results of detection by the sonars 90 (step SA2). The candidate region selection unit 202 executes the selection processing (step SA3).

As illustrated in FIG. 5, the candidate region selection unit 202 executes the overlapping selection processing (step SB1).

As illustrated in FIG. 6, when having determined that the current overlapping selection processing is the second time or later processing ("SECOND OR LATER" at step SC1), the candidate region selection unit 202 determines whether a predetermined duration has elapsed since the start of parking position display (step SC8). The predetermined duration is appropriately determined through test, simulation, or the like in advance in terms of not causing discomfort, unpleasantness, and the like as described later to the user. When having determined that the predetermined duration has elapsed since the start of parking position display (YES at step SC8), the candidate region selection unit 202 forwards the processing to step SC2.

When having determined that the predetermined duration has not elapsed since the start of parking position display (NO at step SC8), the candidate region selection unit 202 specifies one parking-possible space 210 among the one or plurality of parking-possible spaces 210 detected by the parking region detection unit 201 at step SB2 (step SC9).

Then, the candidate region selection unit 202 determines whether the parking space 110 corresponding to the parking-possible space 210 selected at step SC9 is same as the parking space 110 corresponding to the parking-possible space 210 selected as a parking candidate space in the previous selection processing (step SC10). For example, when the area of a region in which the parking-possible space 210 selected at step SC9 overlaps with the parking-possible space 210 selected as a parking candidate space in the previous selection processing is equal to or larger than a predetermined value, the candidate region selection unit 202 performs positive determination at step SC10. The predetermined value is appropriately determined through test, simulation, or the like in advance.

When having performed negative determination at step SC10 the candidate region selection unit 202 forwards the processing to step SC3. When having performed positive determination at step SC10, the candidate region selection unit 202 selects again, as a parking candidate space, the parking-possible space 210 selected as a parking candidate space in the previous selection processing (step SC11).

For example, the parking-possible space 210A illustrated in FIG. 7 is selected as a parking candidate space in the previous selection processing but is not detected by the parking region detection unit 201 in the current selection processing. In this case, the parking-possible space 210B is selected as a parking candidate space by the candidate region selection unit 202, and the parking boundary image CWG is superimposed on the parking-possible space 210B in parking position display based on the current selection processing. Accordingly, the display position of the parking boundary image CWG is moved and the parking assistance device 2 presents an unstable parking position to the user. Thus, during a predetermined duration, the candidate region selection unit 202 selects again, as a parking candidate space, the parking-possible space 210 selected as a parking candidate space in the previous selection processing. Accordingly, the parking assistance device 2 can stably display the parking position of the own-vehicle 1. Thus, the user does not feel discomfort, unpleasantness, and the like attributable to unstable display of the parking position of the own-vehicle 1.

As illustrated in FIG. 6, the candidate region selection unit 202 determines whether all parking-possible spaces 210 are specified at step SC9 (step SC12). When having determined that not all parking-possible spaces 210 are specified at step SC9 (NO at step SC12), the candidate region selection unit 202 specifies a parking-possible space 210 yet to be specified and executes the processing at step SC9 and later. When having determined that all parking-possible spaces 210 are specified at step SC9 (YES at step SC12), the candidate region selection unit 202 ends the overlapping selection processing.

As illustrated in FIG. 5, after having executed the overlapping selection processing, the candidate region selection unit 202 executes the path selection processing (step SB2).

As illustrated in FIG. 8, when having determined that the current path selection processing is the second time or later processing ("SECOND OR LATER" at step SD1), the candidate region selection unit 202 determines whether a predetermined duration has elapsed since the start of parking position display (step SD9). When having determined that the predetermined duration has elapsed since the start of parking position display (YES at step SD9), the candidate region selection unit 202 forwards the processing to step SD2.

When having determined that the predetermined duration has not elapsed since the start of parking position display (NO at step SD9), the candidate region selection unit 202 specifies one parking-possible space 210 among parking-possible spaces 210 selected as parking candidate spaces in the overlapping selection processing (step SD10).

Then, the candidate region selection unit 202 executes processing at steps SD11, SD12, and SD13 same as steps SC10, SC11, and SC12 on the parking-possible space 210 specified at step SD9.

Accordingly, the parking assistance device 2 can stably display the parking position of the own-vehicle 1 even when a traveling path cannot be temporarily calculated due to, for example, false detection or temporary obstacle existence. Thus, the user does not feel discomfort, unpleasantness, and the like attributable to unstable display of the parking position of the own-vehicle 1.

As illustrated in FIG. 5, after having executed the path selection processing, the candidate region selection unit 202 executes the obstacle selection processing (step SB3).

As illustrated in FIG. 9, when having determined that the current obstacle selection processing is the second time or later processing ("SECOND OR LATER" at step SE1), the candidate region selection unit 202 determines whether a predetermined duration has elapsed since the start of parking position display (step SE8). When having determined that the predetermined duration has elapsed since the start of parking position display (YES at step SE8), the candidate region selection unit 202 forwards the processing to step SE2.

When having determined that the predetermined duration has not elapsed since the start of parking position display (NO at step SE8), the candidate region selection unit 202 specifies one parking-possible space 210 among parking-possible spaces 210 selected as parking candidate spaces in the obstacle selection processing (step SE9).

Then, the candidate region selection unit 202 executes processing at steps SE10, SE11, and SE12 same as steps SC10, SC11, and SC12 on the parking-possible space 210 selected at step SE9.

Accordingly, the parking assistance device 2 selects again, as a parking candidate space, the parking-possible space 210 selected as a parking candidate space in the previous selection processing, and thus can stably display the parking position of the own-vehicle 1 even when, for example, an obstacle temporarily exists in the parking-possible space 210. Thus, the user does not feel discomfort, unpleasantness, and the like attributable to unstable display of the parking position of the own-vehicle 1.

As illustrated in FIG. 5, after having executed the obstacle selection processing, the candidate region selection unit 202 executes the display range selection processing (step SB4).

As illustrated in FIG. 10, when having determined that the current display range selection processing is the second time or later processing ("SECOND OR LATER" at step SF1), the candidate region selection unit 202 determines whether a predetermined duration has elapsed since the start of parking position display (step SF8). When having determined that the predetermined duration has elapsed since the start of parking position display (YES at step SF8), the candidate region selection unit 202 forwards the processing to step SF2.

When having determined that the predetermined duration has not elapsed since the start of parking position display (NO at step SF8), the candidate region selection unit 202 specifies one parking-possible space 210 among parking-possible spaces 210 selected as parking candidate spaces in the obstacle selection processing (step SF9).

Then, the candidate region selection unit 202 executes processing at steps SF10, SF11, and SF12 same as steps SC10, SC11, and SC12 on the parking-possible space 210 specified at step SE9.

For example, the parking-possible space 210D illustrated in FIG. 11 is selected as a parking candidate space in the previous selection processing, and not part of the display range HA is temporarily included due to false detection or the like in the current selection processing like the parking-possible space 210E. In this case, the candidate region selection unit 202 does not select the parking-possible space 210D as a parking candidate space and does not superimpose the parking boundary image CWG on the parking-possible space 210D in parking position display based on the current selection processing. Accordingly, the parking boundary image CWG suddenly becomes not displayed, and the parking assistance device 2 cannot stably present a parking position to the user. Thus, during a predetermined duration, the candidate region selection unit 202 selects again, as a parking candidate space, the parking-possible space 210 selected as a parking candidate space in the previous selection processing. Accordingly, the parking assistance device 2 can stably display the parking position of the own-vehicle 1. Thus, the user does not feel discomfort, unpleasantness, and the like attributable to unstable display of the parking position of the own-vehicle 1.

As illustrated in FIG. 5, after having executed the display range selection processing, the candidate region selection unit 202 executes the tilt selection processing (step SB5).

As illustrated in FIG. 12, when having determined that the current tilt selection processing is the second time or later processing ("SECOND OR LATER" at step SG1), the candidate region selection unit 202 determines whether a predetermined duration has elapsed since the start of parking position display (step SG8). When having determined that the predetermined duration has elapsed since the start of parking position display (YES at step SG8), the candidate region selection unit 202 forwards the processing to step SG2.

When having determined that the predetermined duration has not elapsed since the start of parking position display (NO at step SG8), the candidate region selection unit 202 specifies one parking-possible space 210 among one or a plurality of parking-possible spaces 210 selected as parking candidate spaces in the display range selection processing (step SG9).

Then, the candidate region selection unit 202 determines whether the parking space 110 corresponding to the parking-possible space 210 specified at step SG9 is same as the parking space 110 corresponding to the parking-possible space 210 selected as a parking candidate space in the previous selection processing (step SG10).

When having performed negative determination at step SG10, the candidate region selection unit 202 forwards the processing to step SG3. When having performed positive determination at step SG10, the candidate region selection unit 202 determines whether the tilt angle of the parking-possible space 210 specified at step SG9 relative to the front-back direction ZH of the own-vehicle 1 is in the second range (predetermined range) (step SG11). The second range is wider than the first range used in the first time processing and is predetermined through test, simulation, or the like in advance.

When having determined that the tilt angle of the parking-possible space 210 specified at step SG2 relative to the front-back direction ZH of the own-vehicle 1 is not in the second range (NO at step SG11), the candidate region selection unit 202 does not select, as a parking candidate space, the parking-possible space 210 specified at step SG9 (step SG12). When having determined that the tilt angle of the parking-possible space 210 specified at step SG9 relative to the front-back direction ZH of the own-vehicle 1 is in the second range (YES at step SG11), the candidate region selection unit 202 selects, as a parking candidate space, the parking-possible space 210 specified at step SG9 (step SG13).

For example, the parking-possible space 210H illustrated in FIG. 13 is selected as a parking candidate space in the previous selection processing, and the parking-possible space 210H is detected being tilted like the parking-possible space 210G due to false detection or the like in the current selection processing. In addition, the tilt angle is out of the first range. In this case, the candidate region selection unit 202 does not select the parking-possible space 210H as a parking candidate space and does not superimpose the parking boundary image CWG on the parking-possible space 210H in parking position display based on the current selection processing. Thus, during a predetermined duration, the candidate region selection unit 202 selects a parking candidate space by using the second range wider than the first range. Accordingly, even when the parking-possible space 210 selected as a parking candidate space in the previous selection processing is detected being tilted due to false detection or the like, the parking assistance device 2 can select the parking-possible space 210 as a parking candidate space and can stably display the parking position of the own-vehicle 1. Moreover, since selection of a parking candidate space is performed when the tilt angle is in the second range instead of selection based on a single criterion, the candidate region selection unit 202 can prevent degradation of the selection accuracy.

As illustrated in FIG. 12, the candidate region selection unit 202 determines whether all parking-possible spaces 210 are specified at step SG9 (step SG14). When having determined that not all parking-possible spaces 210 are specified at step SG9 (NO at step SG14), the candidate region selection unit 202 specifies a parking-possible space 210 yet to be specified and executes the processing at step SG9 and later. When having determined that all parking-possible spaces 210 are specified at step SG9 (YES at step SG14), the candidate region selection unit 202 ends the tilt selection processing.

As illustrated in FIG. 5, after having executed the tilt selection processing, the candidate region selection unit 202 executes the vehicle overlapping selection processing (step SB6).

As illustrated in FIG. 14, when having determined that the current vehicle overlapping selection processing is the second time or later processing ("SECOND OR LATER" at step SH1), the candidate region selection unit 202 determines whether a predetermined duration has elapsed since the start of parking position display (step SH8). When having determined that the predetermined duration has elapsed since the start of parking position display (YES at step SH8), the candidate region selection unit 202 forwards the processing to step SH2.

When having determined that the predetermined duration has not elapsed since the start of parking position display (NO at step SH8), the candidate region selection unit 202 specifies one parking-possible space 210 among parking-possible spaces 210 selected as parking candidate spaces in the tilt selection processing (step SH9).

Then, the candidate region selection unit 202 executes processing at steps SH10, SH11, and SH12 same as steps SC10, SC11, and SC12 on the parking-possible space 210 specified at step SH9.

For example, the parking-possible space 210J illustrated in FIG. 15 is selected as a parking candidate space in the previous selection processing, and the parking-possible space 210J overlaps with the own-vehicle 1 like the parking-possible space 210K due to false detection or the like in the current selection processing. In this case, the candidate region selection unit 202 does not select the parking-possible space 210J as a parking candidate space and does not superimpose the parking boundary image CWG on the parking-possible space 210J in parking position display based on the current selection processing. Accordingly, the parking boundary image CWG suddenly becomes not displayed, and the parking assistance device 2 cannot stably present a parking position to the user. Thus, during a predetermined duration, the candidate region selection unit 202 selects again, as a parking candidate space, the parking-possible space 210 selected as a parking candidate space in the previous selection processing. Accordingly, the parking assistance device 2 can stably display the parking position of the own-vehicle 1 even when overlapping with the own-vehicle 1 temporarily occurs due to false detection or the like. Thus, the user does not feel discomfort, unpleasantness, and the like attributable to unstable display of the parking position of the own-vehicle 1.

As illustrated in FIG. 5, after having executed the vehicle overlapping selection processing, the candidate region selection unit 202 executes the recommendation selection processing (step SB7).

As illustrated in FIG. 16, when having determined that the current recommendation selection processing is the second time or later processing ("SECOND OR LATER" at step SI1), the candidate region selection unit 202 determines whether a predetermined duration has elapsed since the start of parking position display (step SI9). When having determined that the predetermined duration has elapsed since the start of parking position display (YES at step SI9), the candidate region selection unit 202 forwards the processing to step SI2.

When having determined that the predetermined duration has not elapsed since the start of parking position display (NO at step SI9), the candidate region selection unit 202 specifies one parking-possible space 210 among parking-possible spaces 210 selected as parking candidate spaces in the vehicle overlapping selection processing (step SI10).

Then, the candidate region selection unit 202 determines whether the parking space 110 corresponding to the parking-possible space 210 specified at step SI10 is same as the parking space 110 corresponding to the parking-possible space 210 selected as a recommended parking candidate space or a provisionally recommended parking candidate space in the previous selection processing (step SI11).

When having performed negative determination at step SI11, the candidate region selection unit 202 calculates the separation distance between the parking-possible space 210 specified at step SI10 and the own-vehicle 1 (step SI12). When having performed positive determination at step SI11, the candidate region selection unit 202 calculates the separation distance between the parking-possible space 210 specified at step SI10 and the own-vehicle 1, from which a predetermined distance is subtracted (step SI13).

Then, the candidate region selection unit 202 determines whether all parking-possible spaces 210 are specified at step SI9 (step SI14). When having determined that not all parking-possible spaces 210 are specified at step SI9 (NO at step SI14), the candidate region selection unit 202 specifies a parking-possible space 210 yet to be specified and executes the processing at step SI10 and later. When having determined that all parking-possible spaces 210 are specified at step SI9 (YES at step SI14), the candidate region selection unit 202 executes the processing at step SI5 and later.

In this manner, the separation distance for the parking-possible space 210 estimated as a recommended parking candidate space or a provisionally recommended parking candidate space in the previous selection processing is calculated through subtraction of the predetermined distance so that the calculated separation distance is shorter than the actual separation distance to the own-vehicle 1. Accordingly, the parking-possible space 210 selected as a recommended parking candidate space in the previous selection processing can be prevented from not being selected as a recommended parking candidate space in the current selection processing because the separation distance between the recommended parking candidate space and the own-vehicle 1 temporarily increases due to false detection or the like. Accordingly, the parking assistance device 2 can avoid switching from the recommendation parking boundary image CWG1 to the candidate parking boundary image CWG2 due to false detection or the like and can stably display the parking position of the own-vehicle 1. Thus, the user does not feel discomfort, unpleasantness, and the like attributable to unstable display of the parking position of the own-vehicle 1.

As described above, the parking assistance device 2 continuously selects, as a parking candidate space for the predetermined duration, the parking-possible space 210 selected as a parking candidate space in the previous selection processing. Thus, the parking assistance device 2 can stably display the parking position of the own-vehicle 1 even when the status of surroundings of the own-vehicle 1, which is periodically detected, is changed or when the parking region detection unit 201 performs fault detection. Thus, the parking assistance device 2 can sufficiently assist the user to park the own-vehicle 1.

As described above, the parking assistance device 2 includes: the parking region detection unit 201 configured to periodically detect a parking-possible space 210 (parking-possible region) in which the own-vehicle 1 can be parked based on results of detection by each external image capturing camera 80 (detection unit) and each sonar 90 (detection unit) configured to periodically detect the status of surroundings of the own-vehicle 1 (vehicle); the candidate region selection unit 202 configured to select a parking candidate space (parking candidate region) as a parking candidate for the own-vehicle 1 among the parking-possible spaces 210 detected by the parking region detection unit 201; and the display control unit 204 configured to cause the touch panel 7 (display unit) to display the surrounding image SIG in which the parking position image CG illustrating a parking position is superimposed on the parking candidate space selected by the candidate region selection unit 202. The candidate region selection unit 202 continuously selects, as the parking candidate space, the parking-possible space 210 corresponding to the selected parking candidate space for a predetermined duration.

With this configuration, since the same parking-possible space 210 is continuously selected as the parking candidate space for the predetermined duration, the display position of the parking position image CG is not moved in a case of false detection by the parking region detection unit 201 or a case of temporary change of the status of surroundings of the own-vehicle 1. Thus, the parking assistance device 2 can stably display the parking position of the own-vehicle 1. Moreover, the parking assistance device 2 can stably display the parking position of the own-vehicle 1 and thus does not cause discomfort, unpleasantness, and the like attributable to unstable display of the parking position of the own-vehicle 1 to the user. Accordingly, the parking assistance device 2 can sufficiently assist the user to park the own-vehicle 1.

The candidate region selection unit 202 selects one parking-possible space 210 as the parking candidate space based on a predetermined priority order when a plurality of parking-possible spaces 210 at least partially overlapping with each other are detected by the parking region detection unit 201.

With this configuration, the candidate region selection unit 202 can accurately select the parking candidate space appropriate for actual parking spaces 110 even when a plurality of parking-possible spaces 210 at least partially overlapping with each other are detected by the parking region detection unit 201. Moreover, the parking assistance device 2 can accurately and stably display the parking position of the own-vehicle 1 through the accurate selection of the parking candidate space.

The parking assistance device 2 further includes the path calculation unit 203 configured to calculate a traveling path from the current position of the own-vehicle 1 to the parking-possible space 210 detected by the parking region detection unit 201. The candidate region selection unit 202 selects, as the parking candidate region, the parking-possible space 210, the traveling path of which is calculated by the path calculation unit 203 among the parking-possible spaces 210 detected by the parking region detection unit 201.

With this configuration, the candidate region selection unit 202 can accurately select the parking candidate space into which the own-vehicle 1 can travel at parking. Moreover, the parking assistance device 2 can accurately and stably display the parking position of the own-vehicle 1 through the accurate selection of the parking candidate space.

The external image capturing cameras 80 and the sonars 90 detect an obstacle existing in surroundings of the own-vehicle 1. The candidate region selection unit 202 selects, as the parking candidate space, the parking-possible space 210 in which no obstacle is detected by the external image capturing cameras 80 and the sonars 90 among the parking-possible spaces 210 detected by the parking region detection unit 201.

With this configuration, the candidate region selection unit 202 can accurately select the parking candidate space in which no obstacle exists. Moreover, the parking assistance device 2 can accurately and stably display the parking position of the own-vehicle 1 through the accurate selection of the parking candidate space.

The candidate region selection unit 202 selects, as the parking candidate space, the parking-possible space 210 at least partially included in the display region 71A of the touch panel 7 among the parking-possible spaces 210 detected by the parking region detection unit 201.

With this configuration, the candidate region selection unit 202 can accurately select the parking candidate space to be displayed on the touch panel 7. Moreover, the parking assistance device 2 can accurately and stably display the parking position of the own-vehicle 1 through the accurate selection of the parking candidate space.

The candidate region selection unit 202 selects, as the parking candidate space, the parking-possible space 210, the tilt of which relative to the front-back direction ZH of the own-vehicle 1 is in a predetermined range among the parking-possible spaces 210 detected by the parking region detection unit 201.

With this configuration, the candidate region selection unit 202 does not select a falsely detected parking-possible space 210 as a parking candidate space, and thus can accurately select a parking candidate space. Moreover, the parking assistance device 2 can accurately and stably display the parking position of the own-vehicle 1 through the accurate selection of the parking candidate space.

The candidate region selection unit 202 selects, as the parking candidate space, the parking-possible space 210 not overlapping with the own-vehicle among the parking-possible spaces detected by the parking region detection unit 201.

With this configuration, the candidate region selection unit 202 does not select a falsely detected parking-possible space 210 as a parking candidate space, and thus can accurately select a parking candidate space. Moreover, the parking assistance device 2 can accurately and stably display the parking position of the own-vehicle 1 through the accurate selection of the parking candidate space.

The candidate region selection unit 202 selects, as the parking candidate spaces in the ascending order of the separation distance from the current position of the own-vehicle 1, a predetermined number or less of the parking-possible spaces 210 detected by the parking region detection unit 201.

With this configuration, the candidate region selection unit 202 selects the predetermined number of less of parking candidate spaces, and thus does not select a significantly large number of parking candidate spaces. Moreover, the candidate region selection unit 202 performs the selection in the ascending order of the separation distance from the current position of the own-vehicle 1, and thus can select, as the parking candidate spaces, the parking-possible spaces 210 close to the own-vehicle 1. Accordingly, the candidate region selection unit 202 can select the parking candidate spaces close to the own-vehicle 1 in a number not inappropriate for display. Thus, the parking assistance device 2 can stably display the parking position of the own-vehicle with an appropriate number of parking candidate spaces close to the own-vehicle 1.

When there are a plurality of the selected parking candidate spaces, the candidate region selection unit 202 selects a recommended parking candidate space (first parking candidate region) in which parking of the own-vehicle 1 is recommended and a provisionally recommended parking candidate space (second parking candidate region) different the recommended parking candidate space.

With this configuration, the parking assistance device 2 allows the user to recognize the recommended parking candidate space and the provisionally recommended parking candidate space when there are a plurality of the parking-possible spaces 210 in surroundings of the own-vehicle 1.

The display control unit 204 displays, in manners different from each other, the parking position image CG superimposed on the recommended parking candidate space and the parking position image CG superimposed on the provisional recommended parking candidate space.

With this configuration, the user can easily recognize a most recommended parking-possible space 210.

The parking position image CG is the parking boundary image CWG illustrating a parking boundary.

With this configuration, the user can intuitively recognize the parking position of the own-vehicle.

The above-described embodiment exemplarily describes an aspect of the present invention and may be optionally modified and applied without departing from the scope of the present invention.

For example, the embodiment describes above the configuration in which the selection processing executes the seven pieces of selection processing. However, the selection processing does not need to execute all seven pieces of selection processing, but may execute any one of the seven pieces of the selection processing or may execute a plurality of optional pieces of selection processing among the seven pieces of selection processing. The order of the seven pieces of selection processing is not limited to the order illustrated in FIG. 5.

For example, in the present embodiment, the control unit 20 includes one processor (CPU), and each function of the control unit 20 is achieved by the processor executing processing in accordance with a control program, but may be achieved by a plurality of processors or semiconductor chips. For example, the control unit 20 may additionally include a secondary processing device (co-processor) such as a system-on-a-chip (SoC), a micro control unit (MCU), or a field-programmable gate array (FPGA). The control unit 20 may perform various kinds of control by cooperating both of the CPU and the secondary processing device or selectively using one of them.

For example, FIG. 1 is a schematic diagram illustrating components of the parking assistance device 2 and the own-vehicle 1 in a classified manner in accordance with main processing contents to facilitate understanding of the present application invention, and the components of the parking assistance device 2 and the own-vehicle 1 may be classified into a larger number of components in accordance with processing contents. Furthermore, classification may be performed so that one component executes a larger number of pieces of processing.

For example, processing units of the flowcharts in FIGS. 4, 5, 6, 8, 9, 10, 12, 14, and 16 are obtained through division in accordance with main processing contents to facilitate understanding of processing of the parking assistance device 2, and the present invention is not limited by the scheme of division and names of the processing units. Processing of the parking assistance device 2 may be divided into a larger number of processing units in accordance with processing contents. Furthermore, division may be performed so that one processing unit includes a larger number of pieces of processing.

For example, the embodiment exemplarily describes above the parking assistance device 2 as an on-board device mounted on the own-vehicle 1, but the form of the parking assistance device 2 is optional and may be, for example, a portable device brought by a pedestrian.

REFERENCE SIGNS LIST 1 own-vehicle (vehicle)
2 parking assistance device
7 touch panel (display unit)
80 external image capturing camera (detection unit)
81 front camera (detection unit)
82 right side camera (detection unit)
83 left side camera (detection unit)
84 back camera (detection unit)
90 sonar (detection unit)
91 front sonar (detection unit)
92 right front side sonar (detection unit)
93 right back side sonar (detection unit)
94 left front side sonar (detection unit)
95 left back side sonar (detection unit)
96 back sonar (detection unit)
201 parking region detection unit
202 candidate region selection unit
203 path calculation unit
204 display control unit
210 parking-possible space (parking-possible region)
210A to 210L parking-possible space (parking-possible region)
CG parking position image
CWG parking boundary image
SIG surrounding image (image of surroundings of vehicle)
ZH front-back direction

The invention claimed is:

1. A parking assistance device comprising:
a processor
periodically detects a parking-possible region in which a vehicle can be parked based on a result of detection of a status of surroundings of the vehicle by periodically detecting the status of surroundings of the vehicle based on a captured image of an external camera which is mounted on the vehicle and captures external images of the vehicle;
executes, for each periodically detected parking-possible region, a candidate selection processing including a parking candidate region selection processing to select a parking candidate region as a parking candidate for the vehicle among the detected parking-possible regions, and a recommendation selection processing to select a recommendation parking candidate space for recommending a vehicle parking from the selected parking candidate regions; and
causes a display to display an image of surroundings of the vehicle in which a parking position image illustrating a parking position is superimposed on the selected parking candidate region,
wherein in the recommendation selection processing, when the parking candidate region selection processing is executed for the second time or later, the processor determines whether a predetermined duration is elapsed since the start of parking position display,
when having determined that the predetermined duration is elapsed, the parking candidate region is selected among currently detected parking-possible regions,
when having determined that predetermined duration is not elapsed, the processor determines whether the parking candidate region currently selected in the parking candidate region selection processing is same as the parking candidate region previously selected in the parking candidate region selection processing,
when having determined that the parking candidate region currently selected in the parking candidate region selection processing is same as the parking candidate region previously selected in the parking candidate region selection processing, the processor calculates a separation distance between the parking candidate region and the vehicle through subtraction of a predetermined distance, so as to calculate to be a separation distance shorter than an actual separation distance between the parking candidate region and the vehicle, and the recommendation parking candidate spaces are selected in a predetermined number or less, and in an ascending order of the calculated separation distance.

2. The parking assistance device according to claim 1, wherein the parking candidate region selection processing includes an overlapping selection processing to select one parking-possible region as the parking candidate region based on a predetermined priority order when a plurality of the parking-possible regions at least partially overlapping with each other are detected.

3. The parking assistance device according to claim 1, wherein the processor calculates a traveling path from the current position of the vehicle to the detected parking-possible region,
wherein the parking candidate region selection processing includes a path selection processing to select, as the parking candidate region, the parking-possible region, the traveling path of which is calculated by the path calculation unit among the detected parking-possible regions.

4. The parking assistance device according to claim 1, wherein
the parking candidate region selection processing detects an existence of an obstacle surrounding of the vehicle from images captured by the external camera, and includes an obstacle selection processing to select, as the parking candidate region, the parking-possible region in which no obstacle is detected among the detected parking-possible regions.

5. The parking assistance device according to claim 1, wherein the parking candidate region selection processing includes a display range selection processing to select, as the parking candidate region, the parking-possible region at least partially included in a display region of the display among the detected parking-possible regions.

6. The parking assistance device according to claim 1, wherein the parking candidate region selection processing includes a tilt selection processing to select, as the parking candidate region, the parking-possible region, a tilt of which relative to a front-back direction of the vehicle is in a predetermined range among the detected parking-possible regions.

7. The parking assistance device according to claim 1, wherein the parking candidate region selection processing includes an overlapping selection processing to select as the parking candidate region, the parking-possible region not overlapping with the vehicle among the parking-possible regions detected by the parking region detection unit.

8. The parking assistance device according to claim 1, wherein when there are a plurality of the selected parking candidate regions, the processor selects a first parking candidate region in which parking of the vehicle is recommended and a second parking candidate region different from the first parking candidate region.

9. The parking assistance device according to claim 8, wherein the processor displays, in manners different from each other, the parking position image superimposed on the first parking candidate region and the parking position image superimposed on the second parking candidate region.

10. The parking assistance device according to claim 1, wherein the parking position image is a parking boundary image illustrating a parking boundary.

* * * * *